United States Patent
Anderson et al.

(10) Patent No.: US 10,889,046 B2
(45) Date of Patent: Jan. 12, 2021

(54) DUAL COLOR BLOW MOLDING PROCESS

(71) Applicant: Lifetime Products, Inc., Clearfield, UT (US)

(72) Inventors: Matthew Scott Anderson, Clearfield, UT (US); Mark Cole, Layton, UT (US)

(73) Assignee: LIFETIME PRODUCTS, INC., Clearfield, UT (US)

( * ) Notice: Subject to any disclaimer, the term of this patent is extended or adjusted under 35 U.S.C. 154(b) by 333 days.

(21) Appl. No.: 15/697,246

(22) Filed: Sep. 6, 2017

(65) Prior Publication Data
US 2018/0071969 A1 Mar. 15, 2018

Related U.S. Application Data

(60) Provisional application No. 62/393,457, filed on Sep. 12, 2016.

(51) Int. Cl.
*B29C 49/04* (2006.01)
*B29B 17/00* (2006.01)
*B29C 49/22* (2006.01)
*B29K 105/26* (2006.01)
(Continued)

(52) U.S. Cl.
CPC ........ *B29C 49/041* (2013.01); *B29B 17/0005* (2013.01); *B29C 49/22* (2013.01); *B29K 2023/065* (2013.01); *B29K 2105/26* (2013.01); *B29K 2995/0021* (2013.01); *B29L 2031/307* (2013.01)

(58) Field of Classification Search
CPC ....... B29C 49/041; B29C 49/22; B29C 44/04; B29C 49/04; B29C 51/14; B29C 51/002; B29C 51/421; B29C 51/02
See application file for complete search history.

(56) References Cited

U.S. PATENT DOCUMENTS

| | | |
|---|---|---|
| 2,174,779 A | 10/1939 | Jean |
| 2,233,987 A | 3/1941 | Camillo |
| 3,082,179 A | 3/1963 | Miller |

(Continued)

FOREIGN PATENT DOCUMENTS

| | | |
|---|---|---|
| EP | 0367123 A2 | 5/1990 |
| JP | 2006306470 A | 11/2006 |
| WO | WO2009003662 A2 | 1/2009 |

OTHER PUBLICATIONS

3-Layer Gradient-Colors Blow Molding Machine, Taiwan Excellence, PBS-505-GE-2-E, Kai Mei Plastic Machinery Co.,Ltd, accessed: Aug. 2016.

(Continued)

*Primary Examiner* — Joseph S Del Sole
*Assistant Examiner* — Mohamed K Ahmed Ali
(74) *Attorney, Agent, or Firm* — Workman Nydegger

(57) ABSTRACT

An example extrusion blow molding (EBM) method includes extruding first and second colors of plastic to form a parison that includes an inner layer of the first color of plastic, and an outer layer of the second color of plastic. The parison is placed in a mold, the mold is closed, and the parison is inflated to create a blow molded structure. A portion of an interior of the blow molded structure is formed of the first color of plastic, and a portion of an exterior of the blow molded structure is formed of a blend of the first color of plastic and the second color of plastic.

29 Claims, 32 Drawing Sheets
(28 of 32 Drawing Sheet(s) Filed in Color)

(51) Int. Cl.
*B29K 23/00* (2006.01)
*B29L 31/30* (2006.01)

(56) References Cited

U.S. PATENT DOCUMENTS

| | | | |
|---|---|---|---|
| 3,096,146 A | 7/1963 | Coale | |
| 3,097,058 A | 7/1963 | Branscum | |
| 3,778,207 A | 12/1973 | Luraschi | |
| 3,906,065 A | 9/1975 | Schneider | |
| 3,944,643 A | 3/1976 | Sato et al. | |
| 3,947,177 A | 3/1976 | Eckardt | |
| 4,137,215 A | 1/1979 | Van | |
| 4,149,839 A | 4/1979 | Iwawaki | |
| 4,626,187 A | 12/1986 | Kamada | |
| 4,780,345 A | 10/1988 | Gray | |
| 5,256,051 A | 10/1993 | Langos et al. | |
| 5,562,934 A | 10/1996 | Langos | |
| 5,595,799 A | 1/1997 | Beck | |
| 6,046,265 A | 4/2000 | Clark | |
| 6,561,783 B2 | 5/2003 | Hsu | |
| 6,911,266 B1 | 6/2005 | Skov | |
| 7,661,945 B2 | 2/2010 | Lipson | |
| 7,735,442 B2 | 6/2010 | Richter | |
| 8,557,151 B2 | 10/2013 | Lipson | |
| 8,734,923 B2 | 5/2014 | Shi | |
| 8,895,120 B2 | 11/2014 | Dierickx | |
| 2004/0043169 A1 | 3/2004 | Subramanian et al. | |
| 2004/0197435 A1* | 10/2004 | Shepherd | B29C 45/1816 425/449 |
| 2005/0113486 A1 | 5/2005 | Sandieson | |
| 2005/0173433 A1 | 8/2005 | Spahr | |
| 2005/0252879 A1 | 11/2005 | Pedmo | |
| 2006/0038310 A1 | 2/2006 | Lipson | |
| 2009/0039538 A1 | 2/2009 | Lam | |
| 2011/0155686 A1 | 6/2011 | Maki | |
| 2012/0311971 A1 | 12/2012 | Carvell et al. | |

OTHER PUBLICATIONS

Belcher, Samuel, P.E., et al., Fundamental Manufacturing Processes: Plastic Blow Molding, SME, 1998. sme.org, 1998.

Twin color water pot HDPE Blow Molding Machine extrusion for africa, Meper, Vaino International Ltd., hdpeblowmoldingmachine.com, CE/ISO9001:2008, accessed: Aug. 2016.

International Preliminary Report on Patentability dated Mar. 21, 2019, issued in PCT Application No. PCT/US2017/050483, filed Sep. 7, 2017.

International Search Report and Written Opinion dated Nov. 6, 2017, issued in PCT Application No. PCT/US2017/050483, filed Sep. 7, 2017.

* cited by examiner

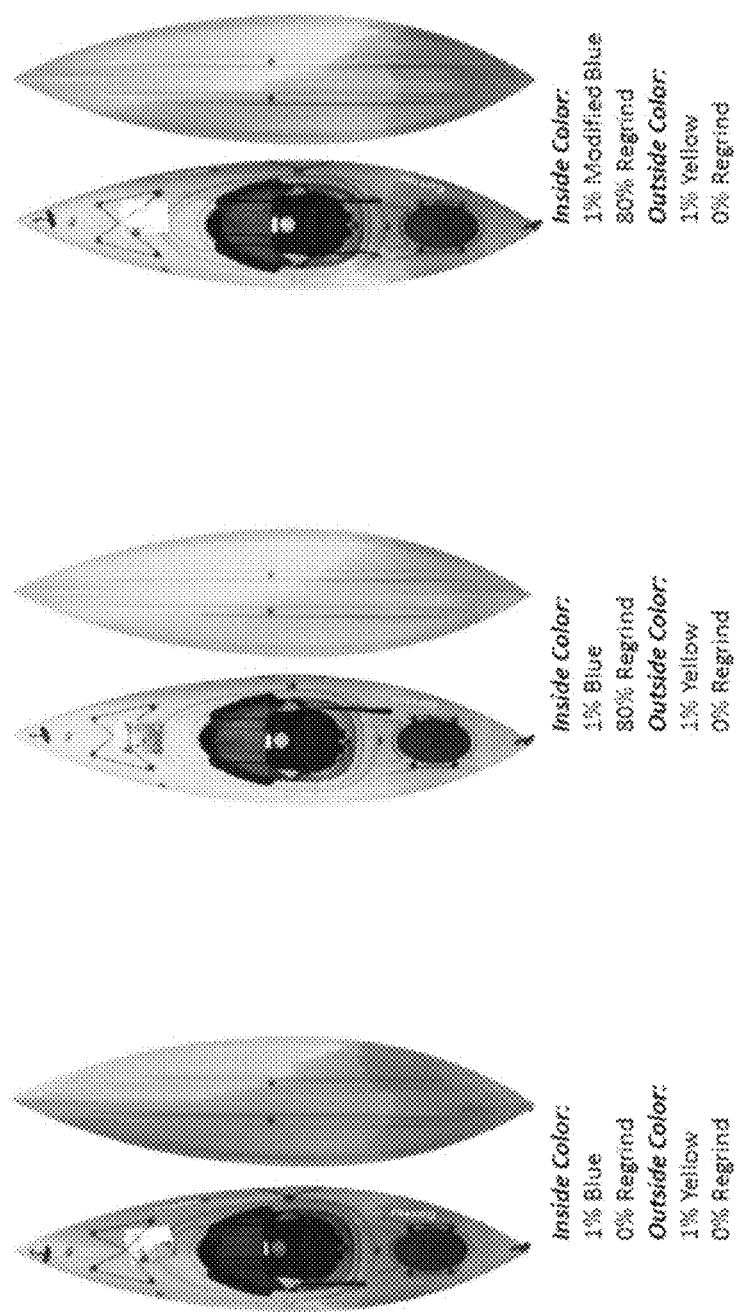

DUAL COLOR BLOW MOLDING PROCESS

RELATED APPLICATIONS

This application hereby claims priority to U.S. Provisional Patent Application Ser. 62/393,457, entitled DUAL COLOR BLOW MOLDING PROCESS, and filed Sep. 12, 2016. The aforementioned application is incorporated herein in its entirety by this reference.

FIELD OF THE INVENTION

The present invention generally relates to blow molding processes and associated products made with the blow molding processes. In at least some embodiments, the blow molding processes result in products that include two or more colors, one or both of which may be visible. Examples of such products include, but are not limited to, watercraft, such as kayaks and other types of boats, and paddleboards. The scope of the invention is not limited to watercraft however and embraces, more generally, any products that can be made by one or more of the disclosed dual color or other multicolor blow molding processes.

BACKGROUND

Relatively large blow molded products such as boats and paddleboards are typically made with a single color of plastic. There are compelling reasons for this single color approach. Notable among these is a technical concern regarding the use of regrind, or waste plastic, that typically results from the post-processing of blow molded products. In particular, after the molding process has been completed for a product, some finishing of the product is typically required. This finishing can involve, for example, grinding off irregularities, cutting openings, trimming off flash, and other processes. These finishing processes thus generate waste plastic. Depending upon the size and nature of the product, such as a kayak for example, the amount of waste plastic generated can be significant.

However, because only a single color of plastic is used to make the product, the waste plastic can be reground into small pieces, melted, and then used in the manufacture of another product of the same color. Thus, where only a single color of plastic is used in the blow molding of a product, most or all of the plastic removed by the finishing of that product, also referred to herein as regrind, can be reused in future production processes. The use of regrind contributes significantly to the economic efficiency of blow molding processes where large blow molded products are concerned. Absent the use of a substantial portion of the regrind, such blow molding processes may not be cost effective.

Considerations such as those noted above have likely played a significant role in forestalling and disincentivizing the use of multiple colors in blow molding processes, particularly blow molding processes used to create relatively large products. For example, if regrind were not the same color as the molded product from which the regrind was generated, the regrind may not be usable, thus potentially undercutting the economic viability of the molding process.

A further example of a consideration that might counsel against the use of multiple colors in a blow molding process is that employment of multiple colors would tend to complicate the overall production process, at least because process parameters specific to blow molding processes, such as extruder screw speeds, for example, would have to be adjusted until such time as a desired effect could be achieved, if at all. A related problem is that if a desired effect were achieved at some point, that result may not necessarily be repeatable even if the same process parameters were used again. Finally, results achieved with the use of multiple colors in a blow molding process might not only be unrepeatable, but the results achieved in connection with any particular instance of a multiple color blow molding process might also be unpredictable, and uncontrollable. Considerations such as these may thus serve as a disincentive for the use of multiple colors in a single blow molding process.

BRIEF SUMMARY OF ASPECTS OF SOME EXAMPLE EMBODIMENTS

Various disclosed embodiments are concerned with dual color blow molding processes that can be used to create relatively large products, examples of which include watercraft such as kayaks and paddleboards. Examples of such kayaks include sit-inside models, as well as sit-on-top models. Yet other embodiments are concerned with the products produced by such blow molding processes. In addition to kayaks and paddleboards, such products can include sailboats, surfboards, paipo boards, boards for wind surfers, kneeboards, wave skimmers, wakeboards, and bodyboards, examples of which include boards referred to as boogie boards. More generally however, the scope of the invention embraces any product that can be produced using an extrusion blow molding process, and the scope of the invention is not limited to watercraft.

In one example embodiment of a method, an extrusion blow molding (EBM) process is employed that involves the use of two different colors of plastic. In at least some embodiments, an EBM process involves multiple colors of plastic which are extruded simultaneously, or nearly simultaneously, to form a parison. For example, respective extrusion processes for each color of plastic in a parison can start and/or end at the same time, but that is not required. Thus, for a particular example parison, an extrusion of plastic of one color may begin before, or after, the extrusion of plastic of another color.

The two different colors of plastic may contrast with each other. To illustrate, one color of plastic may be blue, and the other color of plastic may be yellow. Each color of plastic, in the form of unmelted pellets for example, is fed to a respective extruder that feeds a die of an extruder die head. The extruder die head then forms a parison of melted plastic that has an inner layer of plastic and an outer layer of plastic, and the inner layer of plastic and the outer layer of plastic are attached to each other. In some embodiments, the inner layer of plastic comprises, or consists of, plastic of the first color, while the outer layer of plastic comprises, or consists of, a blend of plastic of the first color and plastic of the second color. To illustrate, the inner layer of plastic may be blue, while the outer layer of plastic may be a blend of blue and yellow, that is, green. In at least some embodiments, both the inner layer of the parison and the outer layer of the parison extend the full length of the parison.

After the parison is formed in the mold, the mold closes and one or more blow pins inflate the parison to fill the mold. The mold can be temperature controlled so that the mold can be heated and cooled, although in at least some embodiments, the mold is not heated. Once the product is formed, the mold is allowed to cool and the product can then be removed from the mold and subjected to one or more finishing processes. As a result of the layered configuration of the parison, the product may exhibit variations in one or more of color, tone, color depth, and color distribution. In the illustrative case of a kayak for example, and using the example color combination of blue and yellow, the interior of the kayak hull may be blue, while various respective exterior surface portions of the kayak may be yellow, and a blend of yellow and blue, that is, green.

As well, and with continuing reference to the aforementioned example color combination, the blue color of the interior may be substantially consistent throughout the interior of the kayak, while the yellow and/or green colors of the exterior surfaces of the kayak may vary in any number of respects, examples of which include tone, depth and distribution, and any combination of these. While such variations may be largely random within a particular instance of a product, these random variations may also be repeatable to some extent in another instance of the same product if the same color combination is used.

The foregoing is presented only by way of example and is not intended to limit the scope of the invention in any way. Moreover, the embodiments disclosed herein do not constitute an exhaustive summary of all possible embodiments, nor does this summary constitute an exhaustive list of all aspects of any particular embodiment(s). Rather, this summary simply presents selected aspects of some example embodiments. It should be noted that nothing herein should be construed as constituting an essential or indispensable element of any invention or embodiment. Rather, and as the person of ordinary skill in the art will readily appreciate, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should such embodiments be construed to implement, or be limited to implementation of, any particular effect(s).

With the foregoing in view, the following example embodiments within the scope of this disclosure are presented. Any of the following embodiments can take the particular example form of a blow molded watercraft, although that is not required, wherein an interior of the watercraft comprises the first/inner layer and an exterior of the watercraft comprises the second/outer layer.

In one example embodiment, a multilayer blow molded structure includes a first layer that has a solid color, and a second layer that has a blend of the solid color and one or more other colors.

In another example embodiment, a multilayer blow molded structure includes a first layer that has a solid color, and a second layer that includes one or more irregularities in one or more of color, color gradient, tone, color depth, and color distribution.

In another example embodiment, a multilayer blow molded structure includes a first layer that has a solid color, and a second layer adjacent the first layer and including one or more irregularities in one or more of color, color gradient, tone, color depth, and color distribution.

In another example embodiment, a multilayer blow molded structure includes a first layer that has a solid color, and a second layer that includes one or more irregularities in one or more of color, color gradient, tone, color depth, and color distribution, and a portion of the second layer includes a blend of the solid color of the first layer and one or more other colors.

In another example embodiment, a multilayer blow molded structure includes an inner layer that has a solid color, and an outer layer that has a blend of the solid color and one or more other colors.

In another example embodiment, a multilayer blow molded structure includes an inner layer that has a solid color, and an outer layer that includes one or more irregularities in one or more of color, color gradient, tone, color depth, and color distribution.

In another example embodiment, a multilayer blow molded structure includes an inner layer that has a solid color, and an outer layer that includes one or more irregularities in one or more of color, color gradient, tone, color depth, and color distribution, and a portion of the outer layer includes a blend of the solid color of the inner layer and one or more other colors.

In another example embodiment, a multilayer blow molded structure includes a first layer that has a solid color, and a second layer that includes one or more irregularities in one or more of color, color gradient, tone, color depth, and color distribution, and a portion of the second layer includes a blend of the solid color of the first layer and one or more other colors, and the respective thicknesses of each of the layers vary at different locations, while the overall thickness of the blow molded structure is substantially the same throughout the blow molded structure.

In another example embodiment, a multilayer blow molded structure includes three or more layers, where each of the layers is either a single color, or a blend of two or more colors, and where a layer with a blend of two or more colors is provided, that layer includes one or more irregularities in one or more of color, color gradient, tone, color depth, and color distribution.

In another example embodiment, a blow molded structure is provided wherein a cross-section of a portion of the blow molded structure has a layered configuration in which a first layer of the cross-section is a solid color, and a second layer of the cross-section is a blend of the solid color and one or more other colors. The blow molded structure of this embodiment can be a watercraft such as a kayak, or any other blow molded structure.

In another example embodiment, a blow molded structure according to any of the aforementioned embodiments possesses a multicolor effect implemented by way of a multilayer configuration that includes one layer which is a solid color and also includes another, adjacent layer, into which some of the solid color has bled, and the adjacent layer including a blend of the solid color and one or more other colors.

In another example embodiment, a blow molded structure according to any of the aforementioned embodiments includes random irregularities in one or more of color, color gradient, tone, color depth, and color distribution.

In another example embodiment, a blow molded structure according to any of the aforementioned embodiments includes random irregularities in one or more of color, color gradient, tone, color depth, and color distribution, and the random irregularities are distributed throughout a majority, or all, of one of the layers.

In another example embodiment, a blow molded structure according to any of the aforementioned embodiments includes random irregularities in one or more of color, color gradient, tone, color depth, and color distribution, and some of the random irregularities in the blow molded structure are repeatable in subsequently formed blow molded structures of the same configuration as the blow molded structure.

In another example embodiment, a blow molded structure according to any of the aforementioned embodiments includes a non-homogeneous distribution of color in one layer.

In another example embodiment, a blow molded structure according to any of the aforementioned embodiments includes two layers that are both made of the same, physically and chemically identical, polymer, one example of which is high-density polyethylene (HDPE).

In another example embodiment, a blow molded structure according to any of the aforementioned embodiments is created without the use of a preform and/or without the use of an overmold.

In another example embodiment, a blow molded structure according to any of the aforementioned embodiments is created without the use of injection molding, stretch blow molding, rotomolding, or twin sheet molding.

In another example embodiment, a blow molded structure according to any of the aforementioned embodiments is created using a process other than injection molding, stretch blow molding, rotomolding, and twin sheet molding.

In another example embodiment, a blow molded structure according to any of the aforementioned embodiments is created with an extrusion blow molding process.

In another example embodiment, a blow molded structure according to any of the aforementioned embodiments is created with an extrusion blow molding process performed by an accumulator-type extrusion machine.

In another example embodiment, a blow molded structure according to any of the aforementioned embodiments is created with an extrusion blow molding process in which, prior to extrusion of a parison that includes a first color and a blend of the first color with one or more other colors, a speed of a feed screw that feeds a first color of plastic is different from a speed of a feed screw that feeds a second color of plastic, and the respective speeds of both feed screws are the same, or about the same, at the time of extrusion of the parison.

In another example embodiment, a blow molded structure according to any of the aforementioned embodiments includes regrind in one or more layers.

In another example embodiment, a parison has two or more layers, one inside the other, that extend a full length of the parison.

In another example embodiment, a parison has two or more layers, where one layer is a solid color and another layer is a blend of the solid color and one or more other colors.

In another example embodiment, a parison has two or more layers, where an inner layer is a solid color and an outer layer is a blend of the solid color and one or more other colors.

In another example embodiment, a parison has two or more layers, where an inner layer is a blend of a solid color and another color that may be part of an outer layer, and the outer layer is a blend of the solid color and one or more other colors.

In another example embodiment, a parison has two or more layers, where two or more layers have a solid color, or two or more layers have a blend of two or more colors.

In another example embodiment, a parison has two or more layers, where a first layer is a solid color and a second layer is a blend of one or more other colors with the solid color, where the solid color has bled into the second layer from the first layer during and/or after extrusion of the parison.

In another example embodiment, a parison has two or more layers, and a thickness of one or more of the layers varies at different locations in the parison, while the overall thickness of the parison is substantially the same throughout a majority of the parison.

In another example embodiment, a parison is provided having the form of any of the aforementioned parisons, wherein the parison is formed using an extrusion blow molding process, such as by way of an extrusion machine including an accumulator head with multiple extruders.

Any structure, including a watercraft, that is constructed at least partly of blow-molded plastic may have an interior that is partly, or completely, hollow. Such embodiments may also include, disposed in the interior, one or more depressions, sometimes referred to as "tack-offs." In such embodiments, these tack-offs may be integrally formed as part of a unitary, one-piece structure during the blow-molding process. The depressions may extend from a first surface, such as a first interior surface of the blow molded structure example, towards a second surface, such as a second interior surface of the blow molded structure. The ends of one or more depressions may contact or engage the second surface, or the ends of one or more of the depressions may be spaced apart from the second surface by a distance. In some instances, one or more depressions on a first interior surface may be substantially aligned with corresponding depressions on a second interior surface, and one or more depressions on the first interior surface may contact one or more corresponding depressions on the second interior surface or, alternatively, one or more depressions on the first interior surface may be spaced apart from corresponding depressions on the second interior surface. In still other instances, depression that contact each other and depressions that are spaced apart from each other may both be present in a watercraft. The depressions may be sized and configured to strengthen and/or reinforce the blow-molded structure.

BRIEF DESCRIPTION OF THE DRAWINGS

This patent or application file contains at least one drawing executed in color. Copies of this patent or patent application publication with color drawing(s) will be provided by the United States Patent and Trademark Office upon request and payment of the necessary fee.

The appended drawings contain figures of example embodiments to further illustrate and clarify the above and other aspects, advantages and features of the present invention. It will be appreciated that these drawings depict only example embodiments of the invention and are not intended to limit its scope. The invention will be described and explained with additional specificity and detail through the use of the accompanying drawings in which:

FIGS. 19-22 disclose color gradient effects achieved in example embodiments of the invention;

FIG. 31 discloses example color effects achieved by varying the amount of regrind used in an inner layer, and further discloses color effects achieved by changes to the opacity of the color used in an inner layer.

DETAILED DESCRIPTION OF EXAMPLE EMBODIMENTS

Figure 1:
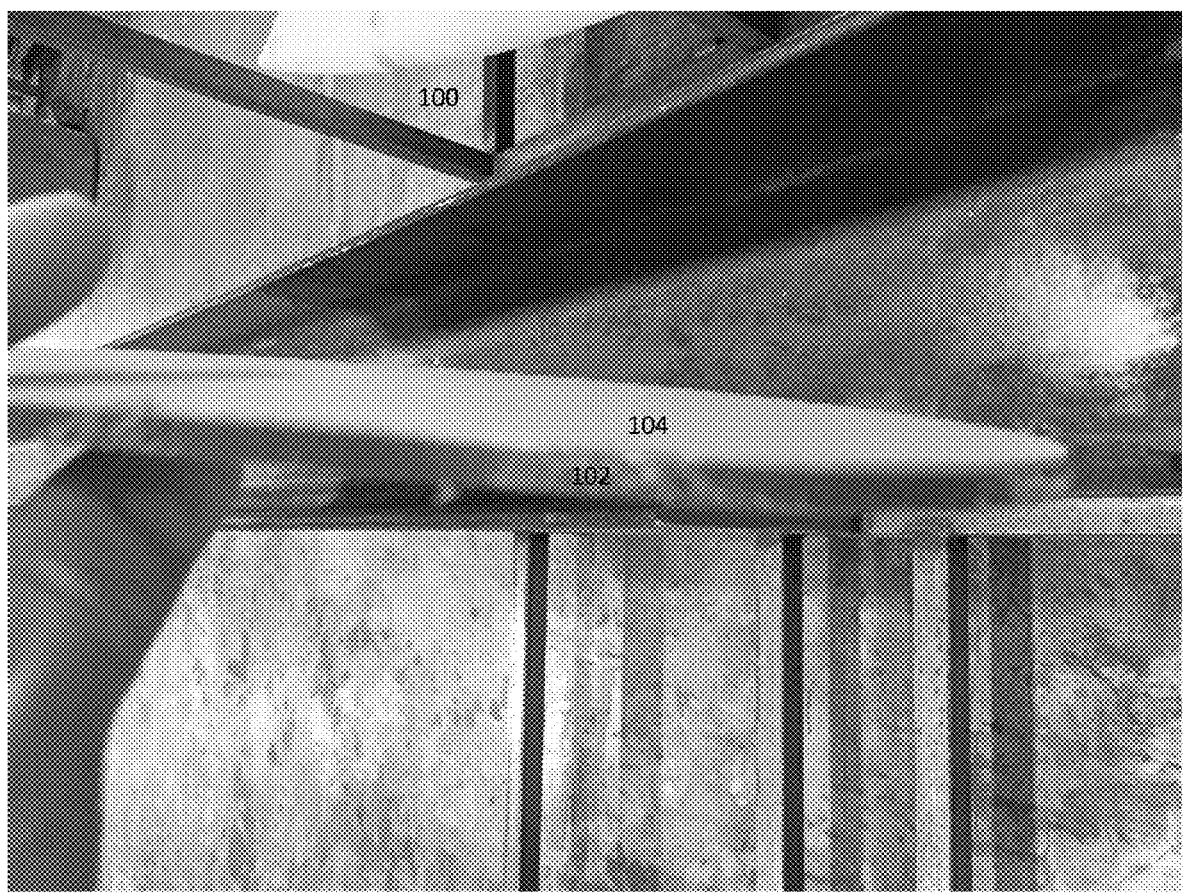
FIGS. 1 and 2 are cross-sections of a portion of an example multilayer blow molded structure.

Some embodiments of the present invention generally relate to watercraft, examples of which include kayaks and other types of boats. Thus, some particular embodiments take the form of a sit-on-top kayak or watercraft, and yet other embodiments take the form of a sit-inside kayak or watercraft. One or more aspects of example embodiments may also find application in watercraft suitable for use in water sports or other activities such as, but not limited to, sailboats, paddleboards, surfboards, paipo boards, wave skimmers, boards for wind surfers, kneeboards, wakeboards, and body boards, examples of which include boards referred to as boogie boards.

More generally however, the scope of the invention is not limited to watercraft and, rather, extends more generally to embrace any blow molded structure, including any extrusion blow molded (EBM) structure. Some examples of blow molded structures include, but are not limited to, coolers, panels, furniture such as tables and chairs, deck and patio storage boxes, toys, and playground equipment such as playsets, sandboxes, walkways, tunnels, slides, platforms, walls, and floors.

A. General Aspects of Some Example Structures and Processes

In general, embodiments of the invention take the form of blow molded structures. In at least some instances, an extrusion blow molding (EBM) process is employed to produce the blow molded structure. The EBM process can be carried out with an accumulator-type extrusion machine, and the extrusion machine may be configured to extrude a parison that includes two, or more, different colors of plastic. The extrusion machine can be configured so that the feed rates of the different colors of plastic can be varied prior to extrusion of the parison. Prior to extrusion, each of the plastics may have only a single color. For example, one plastic may be blue, and the other plastic yellow. In some embodiments, one or more of the plastics used in the extrusion process includes regrind.

Although the various plastics used in the creation of a parison may have different colors, all of the plastics used in the creation of any particular parison may be the same physically and chemically identical polymer, one example of which is high-density polyethylene (HDPE). As such, all of the plastics used in the creation of a particular blow molded structure may have, for example, identical rheological properties. Other suitable types of plastic could alternatively be used.

A parison produced by an EBM process with multiple colors of plastic has a multilayer structure, which can include two or more layers, in which one of the layers is a solid color. Another layer of the parison, which can be adjacent to the solid color layer, is a blend of the solid color and one or more other colors. In some cases, the inner layer of the parison is the solid color layer, while a layer disposed outside of the inner layer is the blended color layer. Such combinations that include a solid layer and a blended color layer were achieved unexpectedly, and unpredictably. Instead, it was expected that a dual color EBM process would produce a parison, and associated blow molded structure, with two layers having respective unblended colors.

The layers of the parison are positioned adjacent to each other to form a stack of layers, and the layers are bonded together so that no gaps are present between adjacent layers. At least after the parison is formed into a blow molded structure, the layers of the parison may be integral with each other, with no seams or partlines formed between layers. As well, the layers of the parison may be integral with each other at some point prior to completion of the blow molding process, such as before inflation of the parison.

The layers of the blow molded structure may be different from each other in their respective thicknesses, although the overall thickness of the stack of layers may be uniform throughout part, or all, of the blow molded structure. In some cases, the solid color layer is relatively thicker than a layer that includes a blend of colors, although the reverse arrangement can also be implemented with the solid color layer being relatively thinner than the layer that includes a blend of colors. As well, the thickness of a particular layer can be different at different locations in the layer, although the overall thickness of the stack of layers may be uniform throughout part, or all, of the blow molded structure.

This blend of colors, which can be produced by bleed through of the solid color layer to the initially solid color of the blended layer during and/or after extrusion, can include irregularities in one or more parameters such as color, color gradient, tone, color depth, and color distribution. These irregularities can be randomly distributed through part, or all, of the blended layer. Although the irregularities may be randomly distributed, they are also repeatable to some extent in subsequent instances of the product, so that multiple instances of a particular structure can be produced that are similar in their appearance. Some irregularities can be produced solely by color blending. Other irregularities can be produced by a combination of mechanisms, such as by color blending as well as by differential stretching of one parison layer relative to another parison layer during the blow molding process. The differential stretching can be a function of the size and/or shape of various features of the blow molded structure.

Irregularities such as those just described can additionally, or alternatively, result from variation in EBM processes such as extrusion screw speed, extrusion start time for one or more of the colors in the extrusion, the volume of a particular color of plastic, and pulsations imposed by the accumulator heads as the plastic exits the heads to form the parison. Additionally, or alternatively, irregularities can result from creep of the plastic in the parison once the parison has been formed. Another mechanism that can be involved is temperature differentials at various locations in the parison. Any one or more of these variable can contribute to the creation of irregularities such as those disclosed herein.

A blow molded structure made from a parison such as the example just described can embody the layering configuration and colors of the parison. For example, a substantially hollow structure may have an interior portion defined by the solid color layer, and an exterior portion, such as the outer surface or skin of a watercraft, defined by the blended color layer. Thus, a cross-section sample of such a structure may have a first layer that is a solid color, and a second layer, which can be adjacent to the first layer, that is a blend of colors. The solid color layer and the blended layer may have respective thicknesses which vary at different locations in the blow molded structure, or those thicknesses could be uniform throughout the blow molded structure. In some embodiments, the aforementioned properties of the layers can be present in any cross-section of any portion of the structure. Further, in any of the disclosed embodiments, a layer of a blow molded structure can be coextensive with one or more other layers of that blow molded structure.

Figure 6:
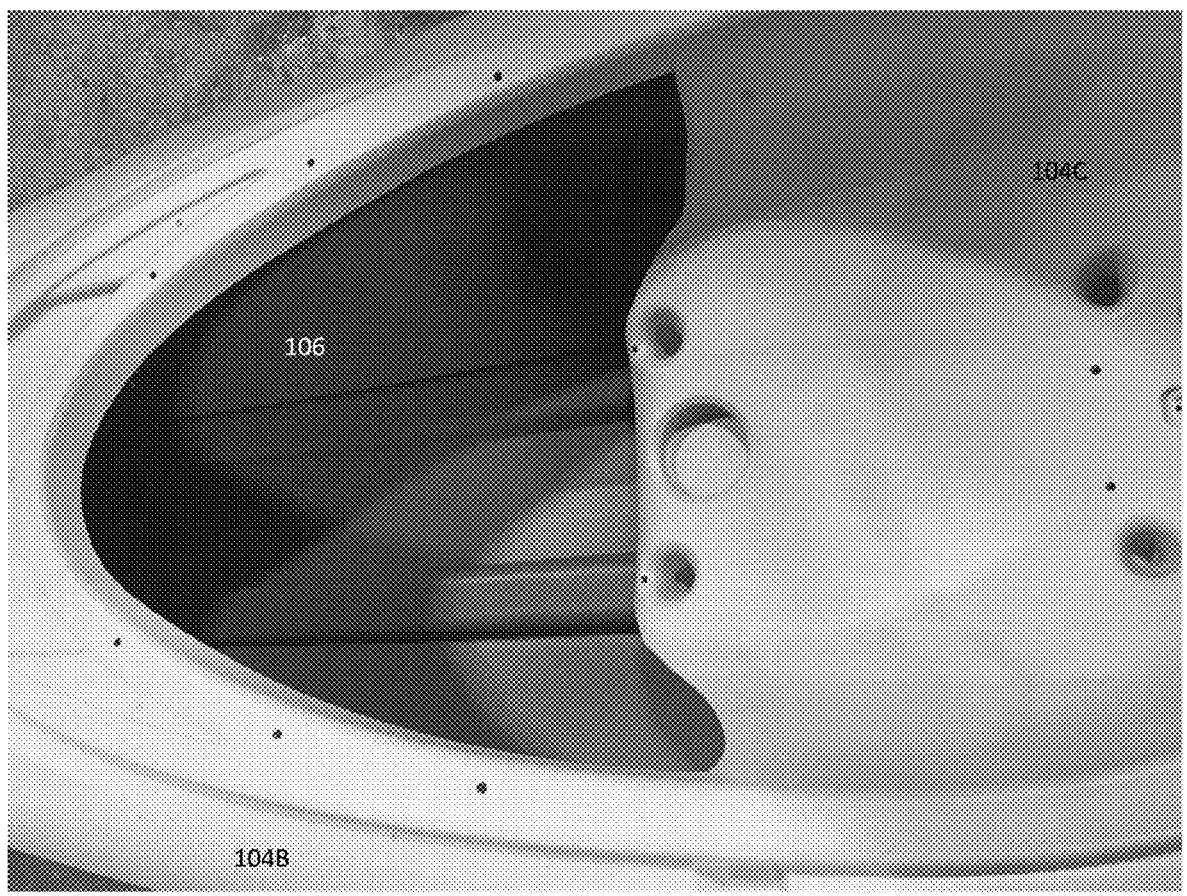

Any of the disclosed embodiments can take the particular example form of a blow molded watercraft, where an interior of a hull of the watercraft comprises the first/inner layer and an exterior, or skin, of the watercraft comprises the second/outer layer. As used herein, an inner/outer layer arrangement refers to the arrangement of the layers as they are, or were, situated in an associated parison. As such, and after inflation of the parison to create a blow molded structure, a portion of a layer, such as a seat surface of a watercraft for example, may be positioned within the interior of an envelope defined by a watercraft, yet still be a part of the outer layer (FIGS. 6 and 15, discussed below, are illustrative) or skin of the watercraft. The inner layer may be disposed within, and/or define, part or all of an interior space of the watercraft or other structure.

B. Some Example Blow Molded Structures and Layer Configurations

Figure 2:
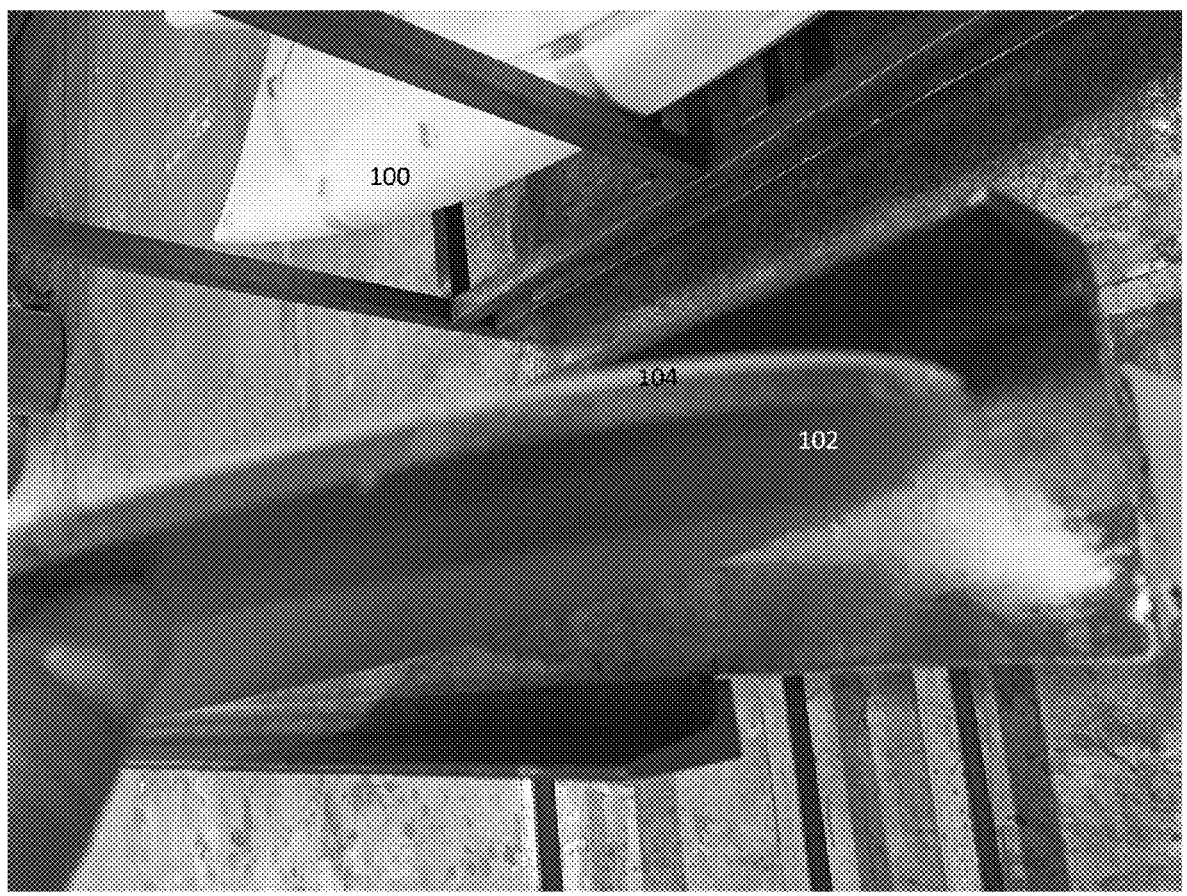
Figure 3:
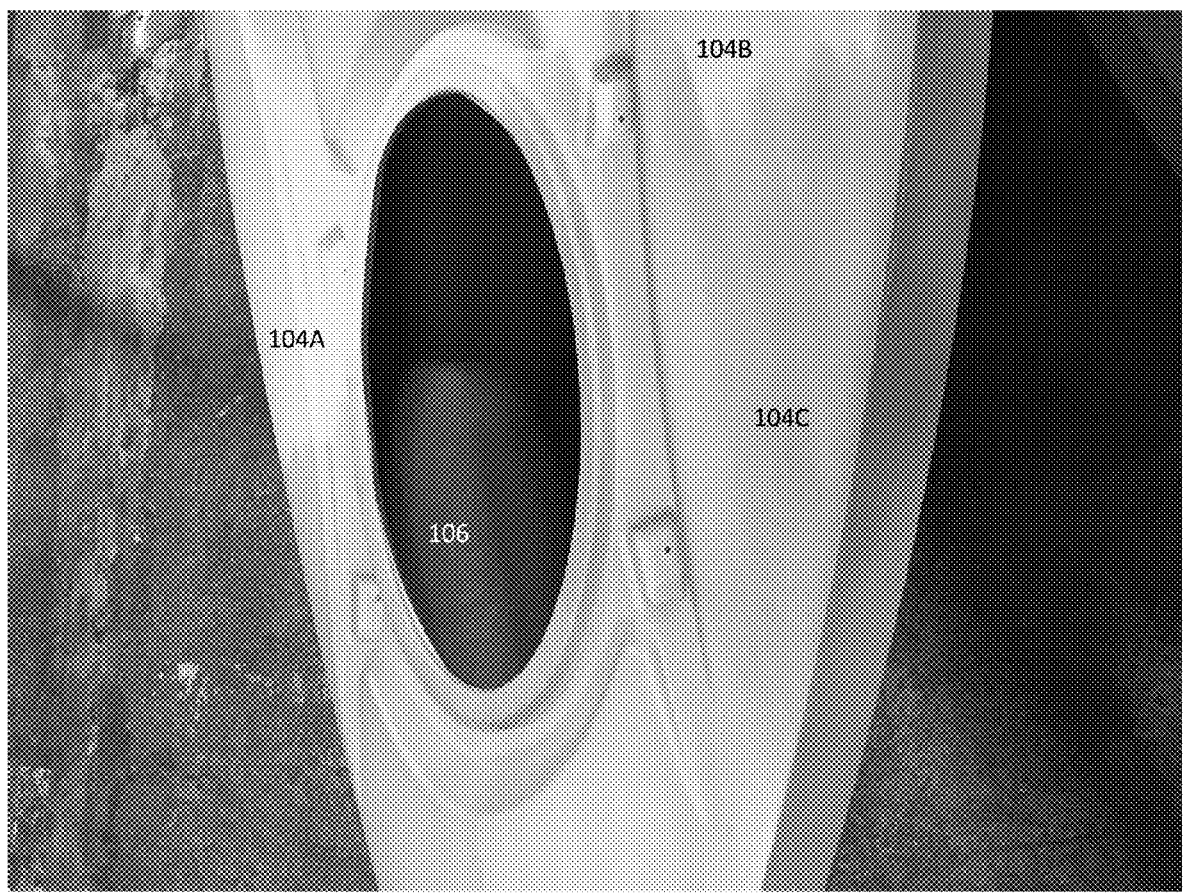
FIGS. 3-17 disclose various color effects achieved in some embodiments of the invention.
Figure 4:
Figure 5:
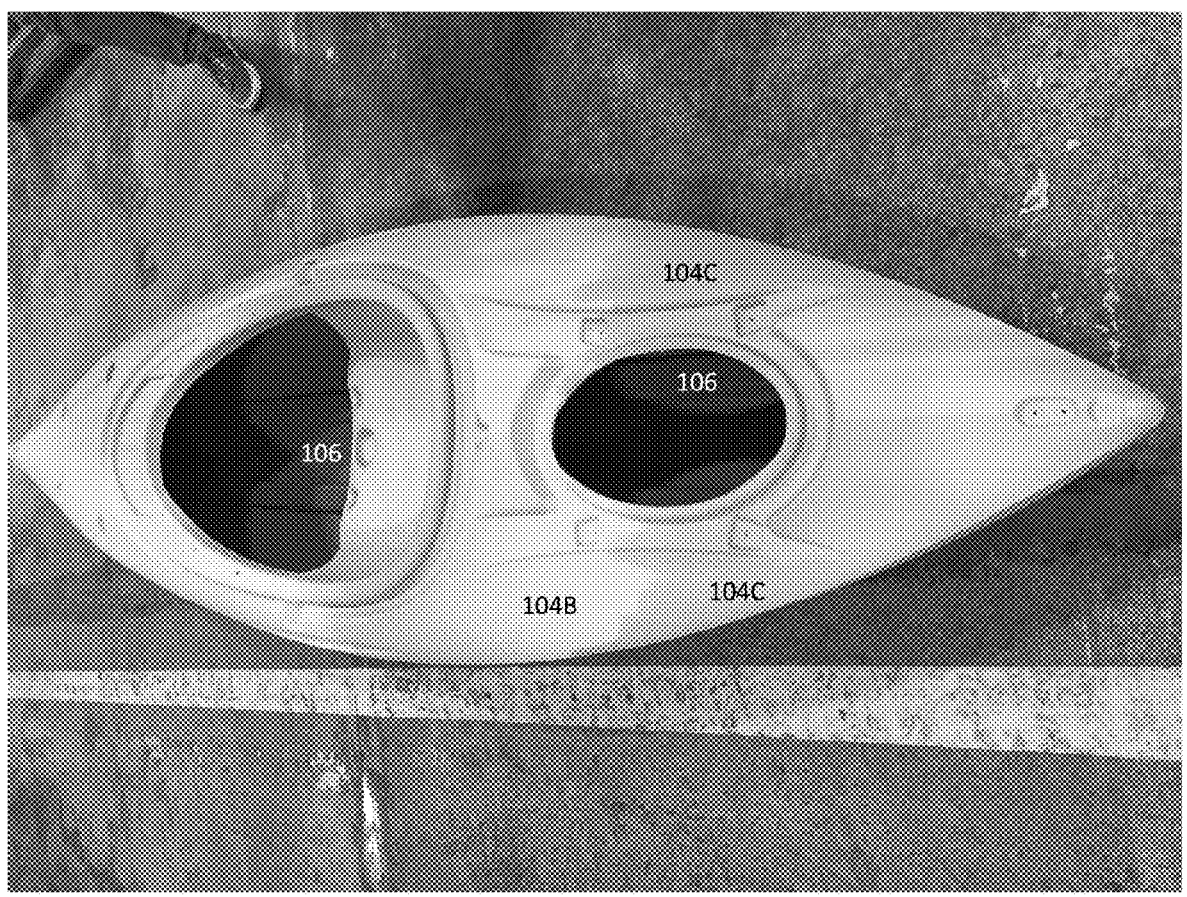

With attention now to FIGS. 1-6, details are provided concerning an example blow molded structure that includes multiple layers. In the illustrated example, the blow molded structure is a kayak. As noted elsewhere herein, such a blow molded structure can be formed through the use of a parison that includes multiple layers, one of which can be partly, or completely, disposed within the other. In the illustrated example embodiment, blue plastic was used for one layer, and yellow plastic for the other layer. As can be seen in FIGS. 1 and 2, a cross-section of a portion of the completed blow molded kayak 100 includes a blue layer 102 and a green layer 104 adjacent to the blue layer 102. The layers 102 and 104 vary in thickness, and the green color of the layer 104 indicates that some blue plastic from the layer 102 has bled into the layer 104 (initially yellow in color) during and/or after extrusion of the parison to produce the illustrated green color.

With particular reference to FIGS. 3-6, further details are provided concerning the example kayak 100. As shown, the kayak 100 is a sit-inside configuration, while some other embodiments are directed to a sit-on-top configuration. In the illustrated example, the blue layer 102 defines the interior 106 of the kayak 100. Thus, when the parison for the kayak 100 was formed, the blue layer 102 was the inner layer of the parison, and the yellow layer, now a blended color layer 104, was the outside layer of the parison.

It should be noted that the resulting color effects shown in the Figures were unexpected however. In particular, it was believed, prior to the implementation of the disclosed processes, that the use of two colors in an extrusion blow molding process would result in a blow molded structure such as a kayak having a single color inner layer, and a single color outer layer, with little or no blending or bleeding of either color into the other. That is, it was believed that, for example, the use of blue plastic and yellow plastic in a single EBM process would produce a kayak with a blue interior and a yellow exterior. Thus, the color effects shown in the Figures were a surprising result. It should be noted that as used herein, 'single color' does not mean that a layer having a single color must be only one of the three primary colors, that is, red, blue or yellow. In fact, the 'single color' could be a primary color or the 'single color' could be any combination of colors, primary or otherwise. Thus, 'single color' is intended to be broad in scope and simply means that layer is a uniform color and does not exhibit blending or bleed through effects. This notion is illustrated, for example, in the Sample 2 photograph in FIG. 25 (discussed in more detail below). Particularly, the layer of plastic that makes up the interior is a uniform blue-green color, while the layer that makes up the outer skin of the kayak has a non-uniform distribution of yellow and green of various shades and intensities.

As collectively illustrated in FIGS. 3-6, the inner blue layer 102 has not changed color as a result of the extrusion and blow molding processes. However, the layer 104, now the outer layer of the kayak 100, exhibits irregularities in one or more of color, color gradient, tone, color depth, and color distribution. Thus, some portions 104a of the layer 104 are substantially, or completely, yellow in color. Other portions 104b of the layer 104 are relatively light green, and still other portions 104c are relatively dark green. As can also be seen in FIGS. 3-6, and discussed in connection with other Figures below, the irregularities are often randomly distributed throughout the layer 104.

C. Some Example Color Distributions

Figure 7:
Figure 8:
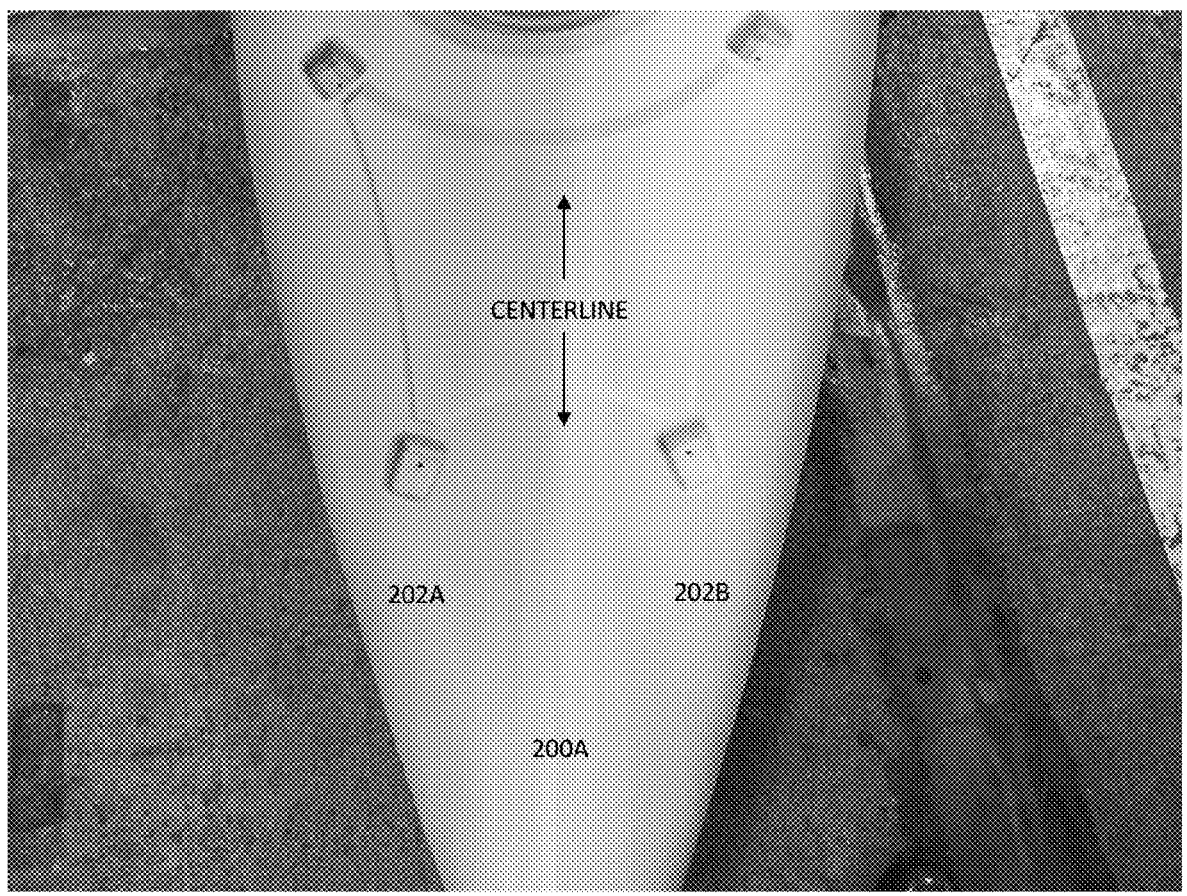
Figure 10:
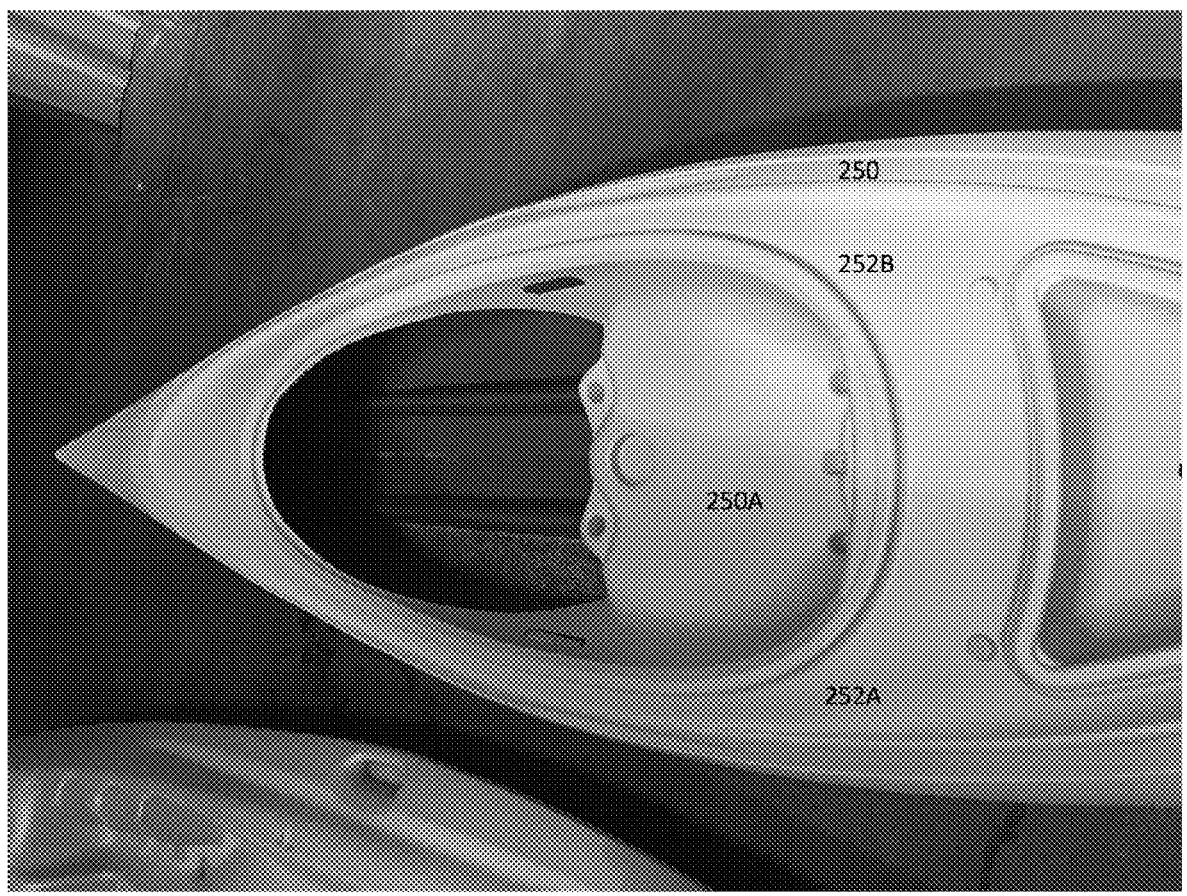
Figure 11:

As noted in the discussion of FIGS. 1-6, unexpected effects were achieved with the disclosed multicolor EBM processes. With reference now to FIGS. 7-17, further details are provided concerning various examples of color effects. Turning first to FIGS. 7-8, it can be seen that in at least a bow section 200a of the sit-inside kayak 200, two different tones 202a and 202b of the blended, that is, green, color are relatively evenly distributed on either side of a centerline of the kayak 200, with a slight color gradient between the two sides. As can further be seen, such as in the aft section 200b of the kayak 200 however, this distribution is not maintained throughout the entirety of the kayak 200. An effect similar to that illustrated in the example of FIGS. 7 and 8 is shown in FIGS. 10, 11 and 14, although different colors are used, namely, red and yellow, with the result that the inner layer of the kayak 250 is red, while the outer layer, or skin of the kayak, is a blend of red and yellow. Put another way, opposing sides of the stack of plastic layers that makes up the kayak is red on one side, and a blend of red and yellow on the opposing side.

Figure 9:
Figure 12:
Figure 13:
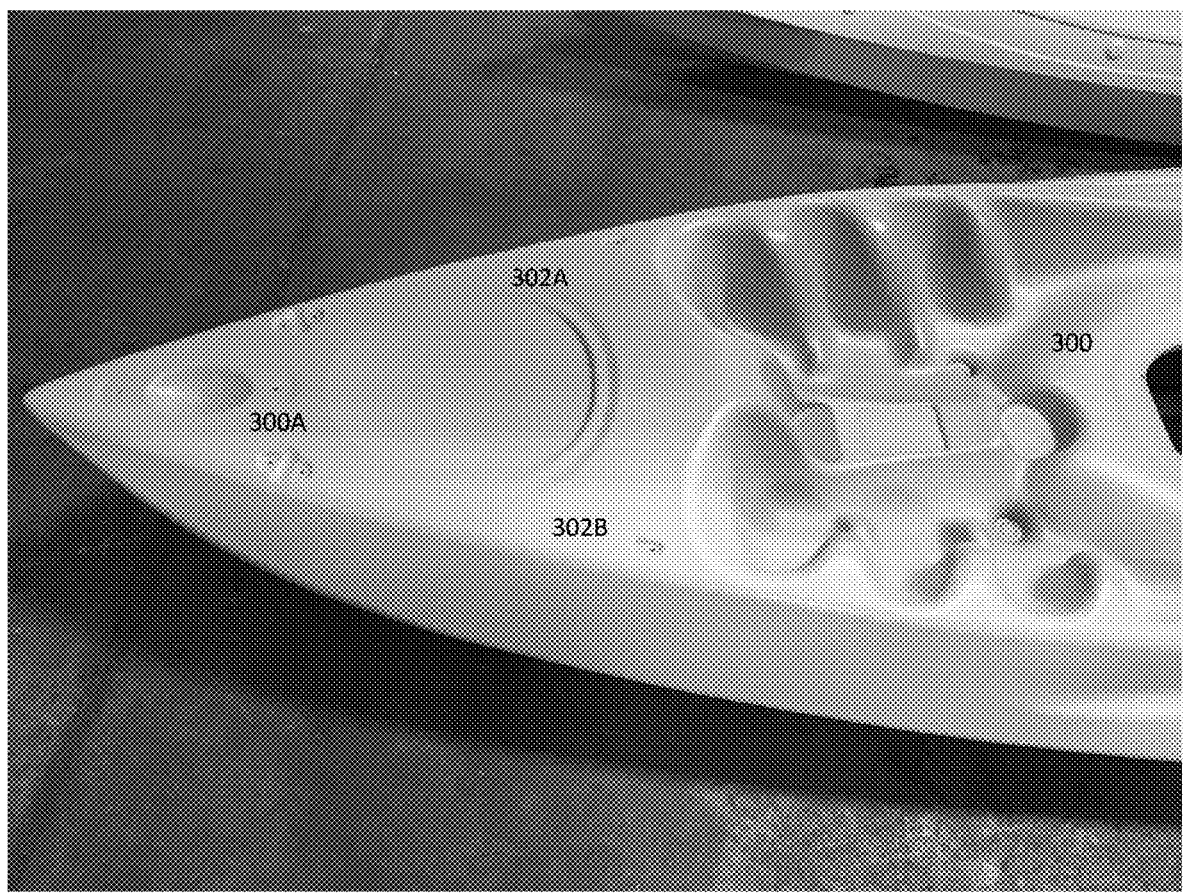
Figure 14:
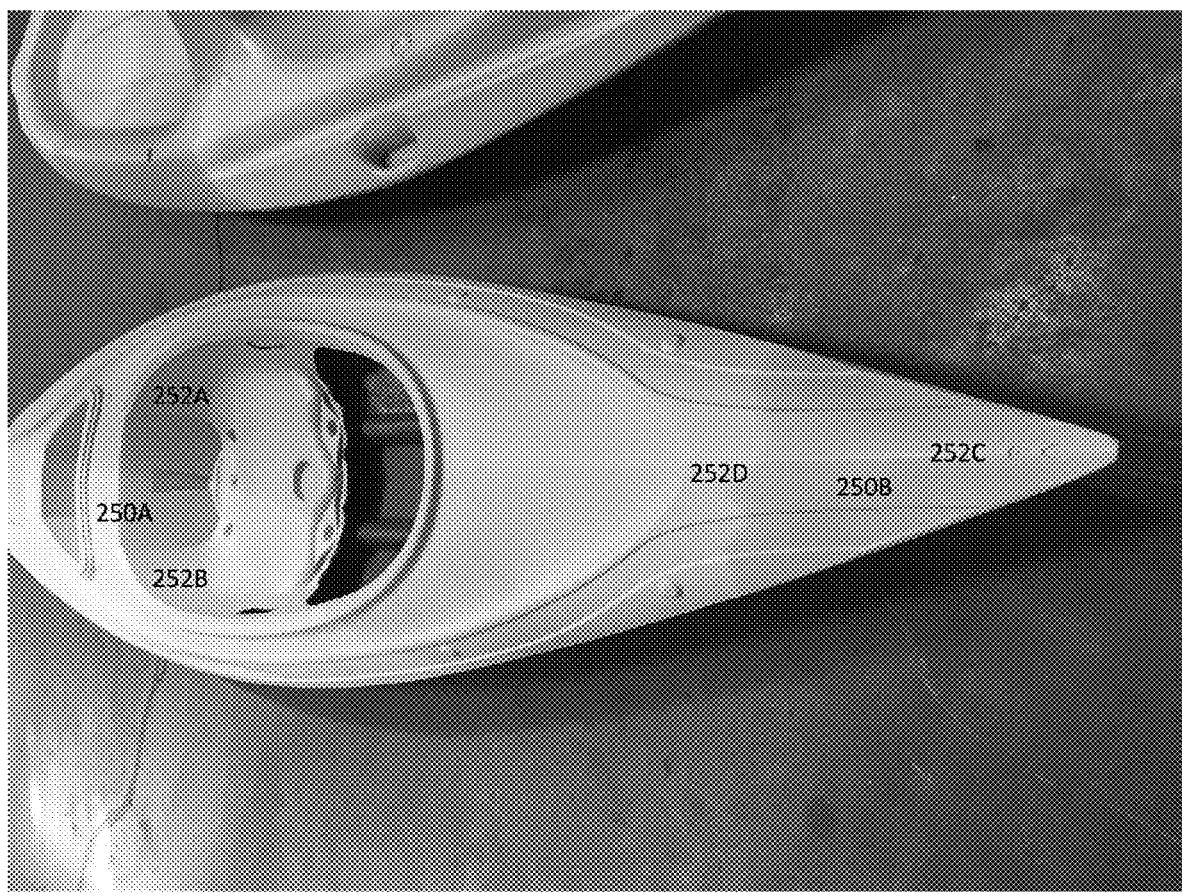

By way of contrast, and with reference now to FIGS. 9, 12 and 13, in an example sit-on-top kayak 300, two different tones 302a and 302b of the blended, that is, green, color are unevenly distributed on either side of a centerline of the kayak 300, with a slight color gradient between the two sides. In particular, the color gradient is offset from the centerline of the kayak 300, and the tone 302a is predominant over the tone 302b in terms of the distribution of that tone in the bow portion 300a of the kayak 300.

Turning again to FIGS. 10, 11 and 14, further examples of color distribution are disclosed. As shown, the stern portion 250a of the kayak 250 is relatively even in terms of the distribution of the tones 252a and 252b. However, the bow portion 250b exhibits a different color distribution. In particular, a forward-most section of the bow portion 250b has a first tone 252c, while an after section of the bow portion 250b has a second tone 252d. As shown, there is little to no color gradient between the tones 252c and 252d, and the dividing line between the two tonal portions is random and uneven. As well, and with reference to at least the bow portion 250b and 252d, it can be seen that part of the color distribution occurs in a fore-and-aft manner, rather than in a port-starboard manner as seen, for example, in FIG. 7. FIG. 14 further discloses that within a single blow molded structure, such as a kayak for example, color distribution can occur both in a longitudinal aspect and a lateral aspect, the latter aspect being illustrated by the stern portion 250a.

Figure 15:
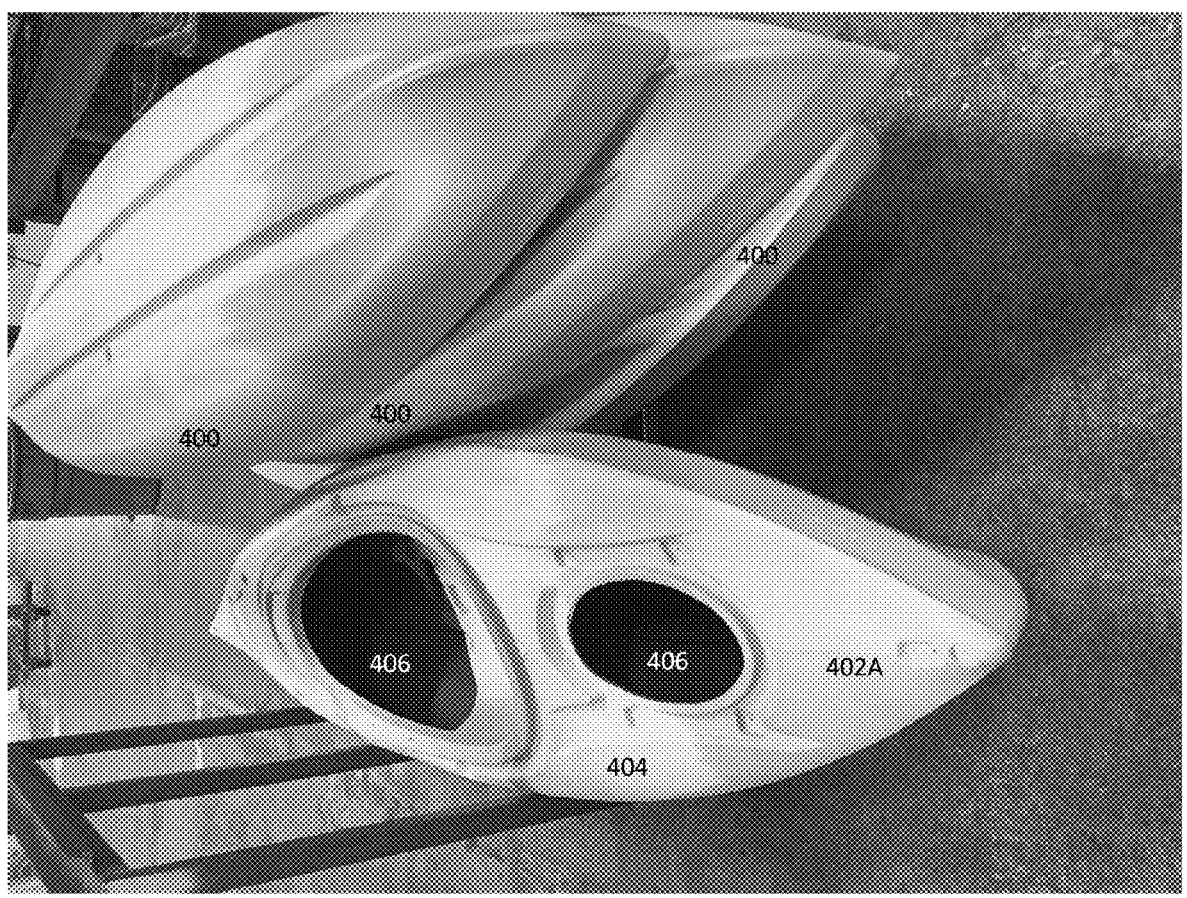
Figure 16:
Figure 17:
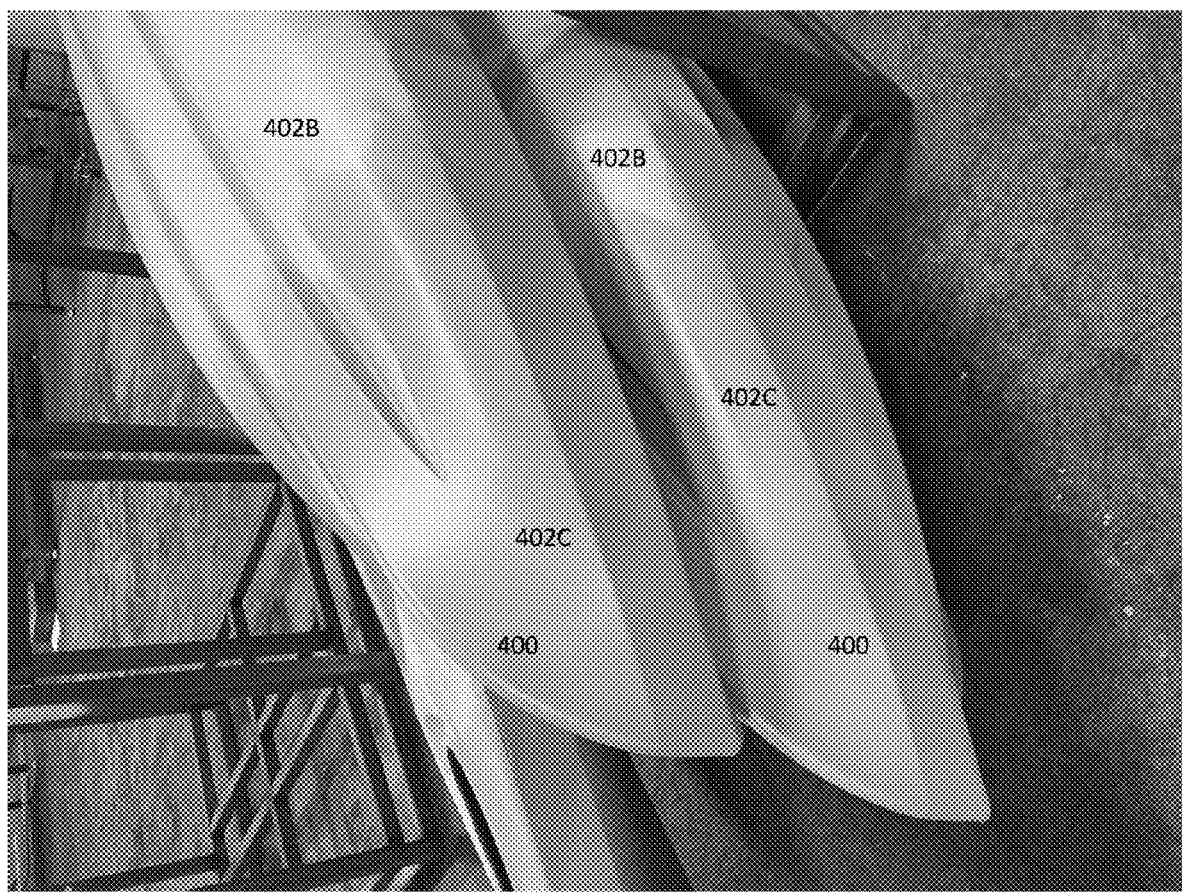
Figure 18:
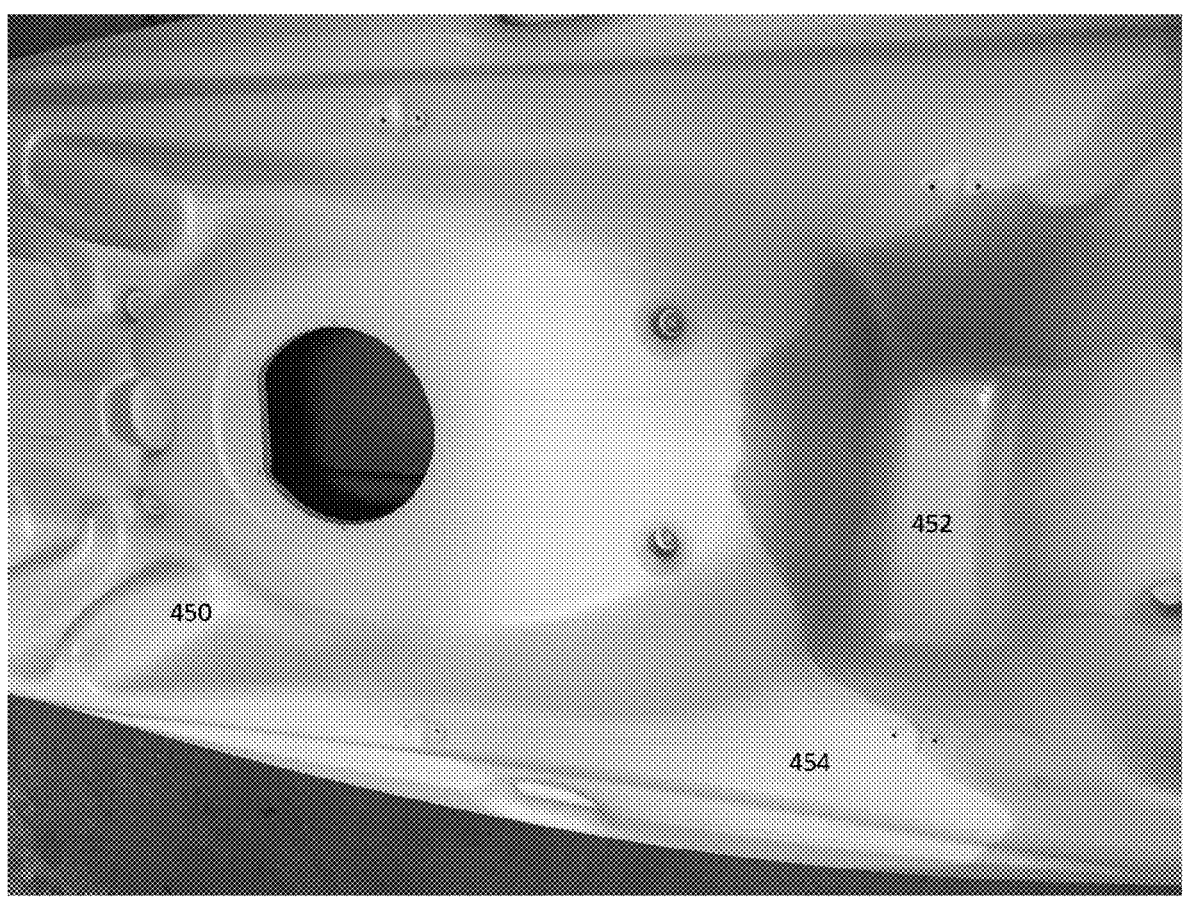
FIGS. 18-21 disclose various example color effects believed to result from stress and/or strain imposed on one or more layers during extrusion and/or blow a molding.

With regard to FIGS. 15-17, it can be seen that the size, distribution, and color of the green and yellow portions may be random throughout the outer layer of the kayaks 400. Moreover, multiple different tones of green 402a, 402b and 402c are present in these examples. One or more of the kayaks 400 also include a yellow, or substantially yellow, tone 404 in an outer layer. Similar to other embodiments disclosed herein, the inner layer of the kayaks 400 can be a single unblended color 406, such as blue, or either of the other primary colors red or yellow. Alternatively, the inner layer and/or outer layer can be a non-primary color.

It should be noted that as used herein, unblended refers to a lack of blending or bleeding in one of the layers of the parison and associated blow molded structure. Thus, for example, an interior of a blow molded structure could be purple, that is, a combination of the primary colors red and blue, but the purple color is considered as unblended insofar as there is no blending or bleeding, into the purple layer, of another color or colors from another layer of the same blow molded structure.

With continued reference to FIGS. 15-17, it can be seen that in some embodiments, there may be little or no color gradient between different tones of green, such as between the tones 402b and 402c. Further, it was noted above that the distribution of the different colored portions, such as the green and yellow portions, can be random within any particular kayak 400. As best shown in FIGS. 15 and 17 however, it may nonetheless be the case that such a random distribution of colors within a given blow molded structure is repeatable, to a significant extent, in multiple instances of that particular blow molded structure.

It should be noted that in some embodiments, bleed through of color from the outer layer into the inner layer may occur such that the inner layer includes a blend of the outer layer color(s) with the inner layer color(s). In these example embodiments, one or both layers can initially be a single solid color. Such bleed through and blending can occur in a two layer structure, as well as in a structure that includes more than two layers. In the latter case where more than two layers are present in the structure, the blending and bleed through can be present in a single layer or can be present in multiple layers of the structure. As the foregoing thus makes clear, the scope of the invention is not limited to embodiments in which the inner layer color bleeds into, and blends with, the outer layer color. For example, color bleeding can be mono-directional, that is, only from one layer into another layer, or bi-directional between two layers. It should be noted that color bleeding refers to the movement of plastic of one color into plastic of another color. Color bleeding can occur within a single layer, and/or between two or more layers.

D. Some Example Color-Related Irregularity Mechanisms

With reference now to FIGS. 18-21, details are provided concerning some example color distribution mechanisms at work in at least some example blow molded structures created using the disclosed process(es). It was noted earlier that irregularities in one or more of color, color gradient, tone, color depth, and color distribution can be due in part to blending and/or bleed through of a color in one layer of a parison with/into another layer of that parison. However, other mechanisms and considerations can additionally or alternatively contribute to the presence of such irregularities.

For example, in some embodiments, stretching of one or more of the parison layers during an EBM process can also produce, or at least contribute to the presence of, one or more of such irregularities. To illustrate, a yellow layer thinly stretched over a blue layer will result in a relatively dark green appearance, due to the dominance of the blue layer and the relative thinness of the yellow layer. On the other hand, a yellow layer relatively less thinly stretched over a blue layer can result in a relatively lighter green layer, or even a yellow layer if the yellow layer is largely unstretched and/or if the yellow and blue layers are each stretched to about the same extent. Thus, one layer, such as the yellow layer, in a blow molded structure may be stretched, or otherwise manipulated, preferentially with respect to another layer, such as the blue layer, in that blow molded structure.

In other embodiments, various color effects can be achieved through selection of one or more colors having a particular opacity. In some cases, selective use of one or more colors having a particular opacity may produce effects similar to those achieved by stretching. By selective use of various color opacities, color effects disclosed herein may be achieved, in at least some instances, without the need to adjust feed screw speeds in an EBM machine, thus simplifying the manufacturing process.

With particular reference now to FIGS. 18-21, it can be seen that kayak 450 includes an area 452 near the seatback portion that is a significantly darker green color that nearby areas 454 of the kayak. Moreover, the relatively dark green color of the area 452 near the seatback portion is highly localized. This is believed to be due, in some cases at least, to stretching of the yellow layer of the parison during the blow molding process. In particular, because the seatback portion extends out relatively far from the main body of the kayak 450, the outer yellow layer is stretched to a greater extent in the area 452 of the seatback portion than in other areas of the kayak 450, thus allowing the darker blue color of the inner layer to significantly affect the tone in the area 452 of the seatback portion. Correspondingly, it can be seen that the yellow layer in the area 454, which does not extend outwardly as far as the seatback portion in the area 452, is not stretched to the same extent as the yellow layer in the area 452 of the seatback portion and, as such, the area 454 appears significantly more yellow than green because the relatively thicker yellow layer in the area 454 tends to reduce the ability of the blue layer to show through. Notwithstanding the stretching of the yellow layer in this example, the overall thickness of the yellow layer and blue layer together is the same throughout the kayak 450.

As well, it should be noted that the blue layer in the area 452 of the seatback portion is not stretched to the same extent as the yellow layer in that area. This circumstance also contributes to the dark green appearance in that area. If the blue layer were stretched significantly in the same area where the yellow layer is stretched, the green color would likely be noticeably lighter than shown in the area 452 of the seatback portion since the relatively dark blue color would be attenuated by the stretching of the blue layer. As will be apparent from the foregoing discussion, the variations in color throughout a blow molded structure created as disclosed herein may indicate, to some extent at least, the relative distribution and magnitude of stresses and/or strains that occur in the layers during extrusion and/or blow molding of the product, and that may vary from one layer to another, and may vary in different locations within each layer.

Figure 22:
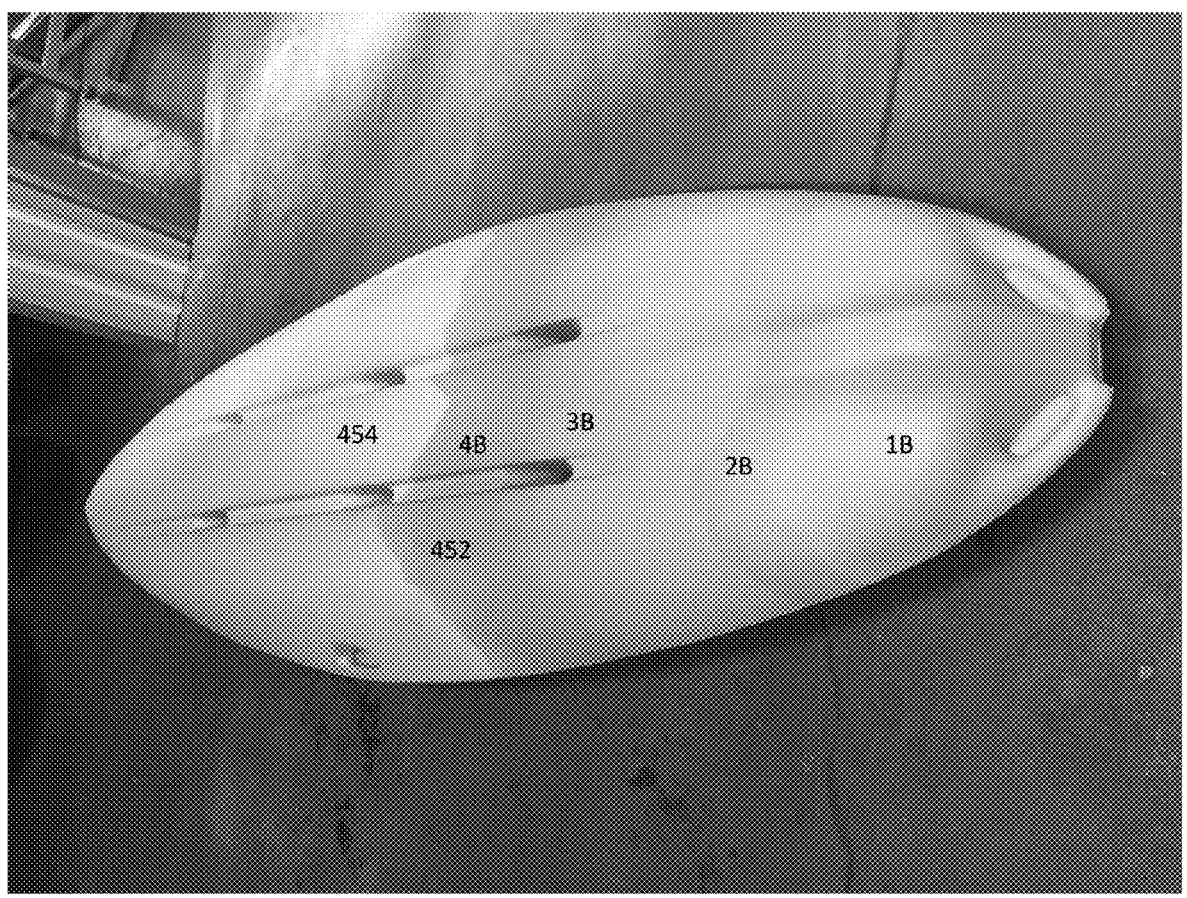

With reference now to FIG. 22, it can be seen that there is a pronounced color differential, with little or no color gradient, near the middle of the bottom of the kayak 450. In particular, the color transitions rapidly between the area 454 and the area 452, which correspond to the area 454 and 452, respectively, shown in the top side view of the kayak 450 in FIG. 17 for example. The presence of a similar color differential in the top and bottom of the kayak 450 suggests that the stretching that occurs in the area 452 of the seatback portion on the top side of the kayak 450 causes a stretching effect in the yellow layer of the bottom side of the kayak 450 as well. Similar to the example of FIG. 17, the color transition on the bottom of the kayak 450 is highly localized.

E. Color Gradients

Figure 19:
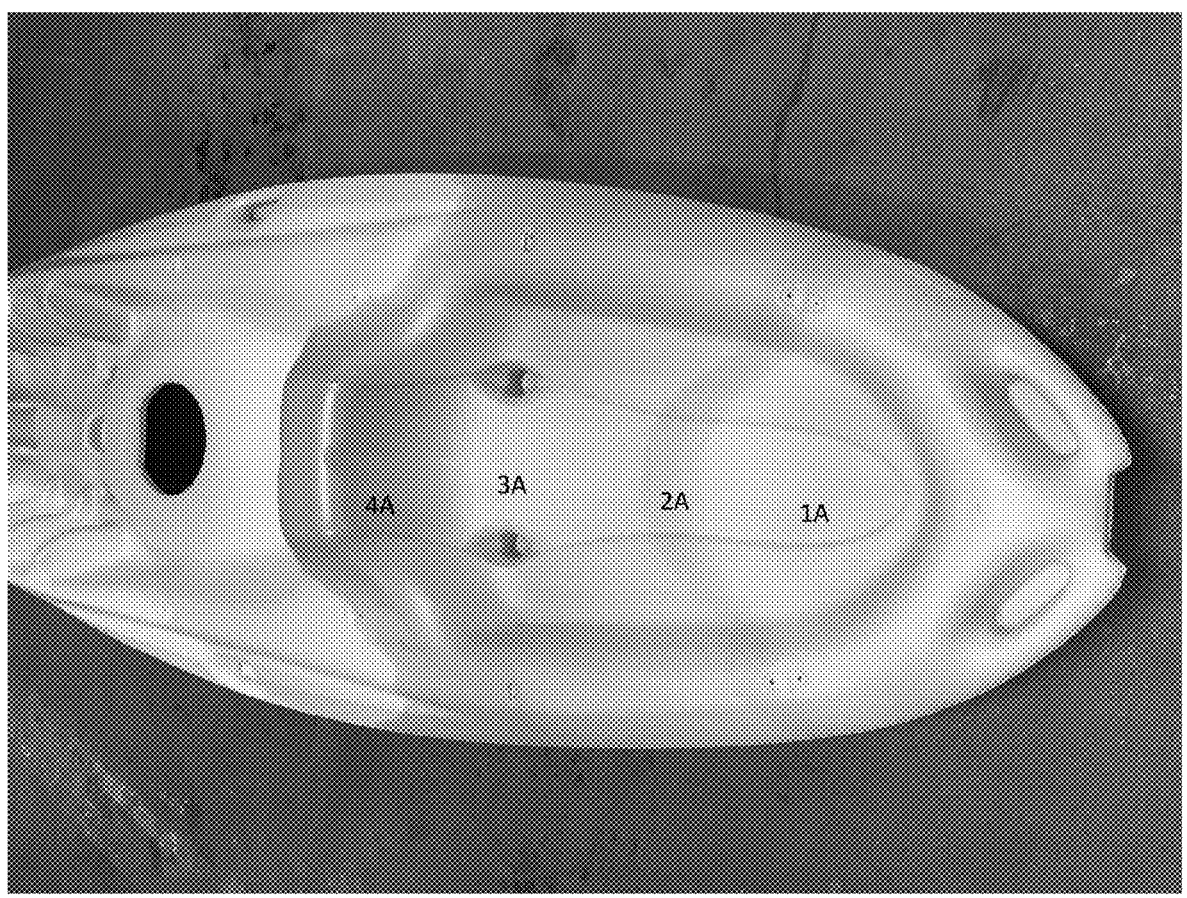
Figure 20:
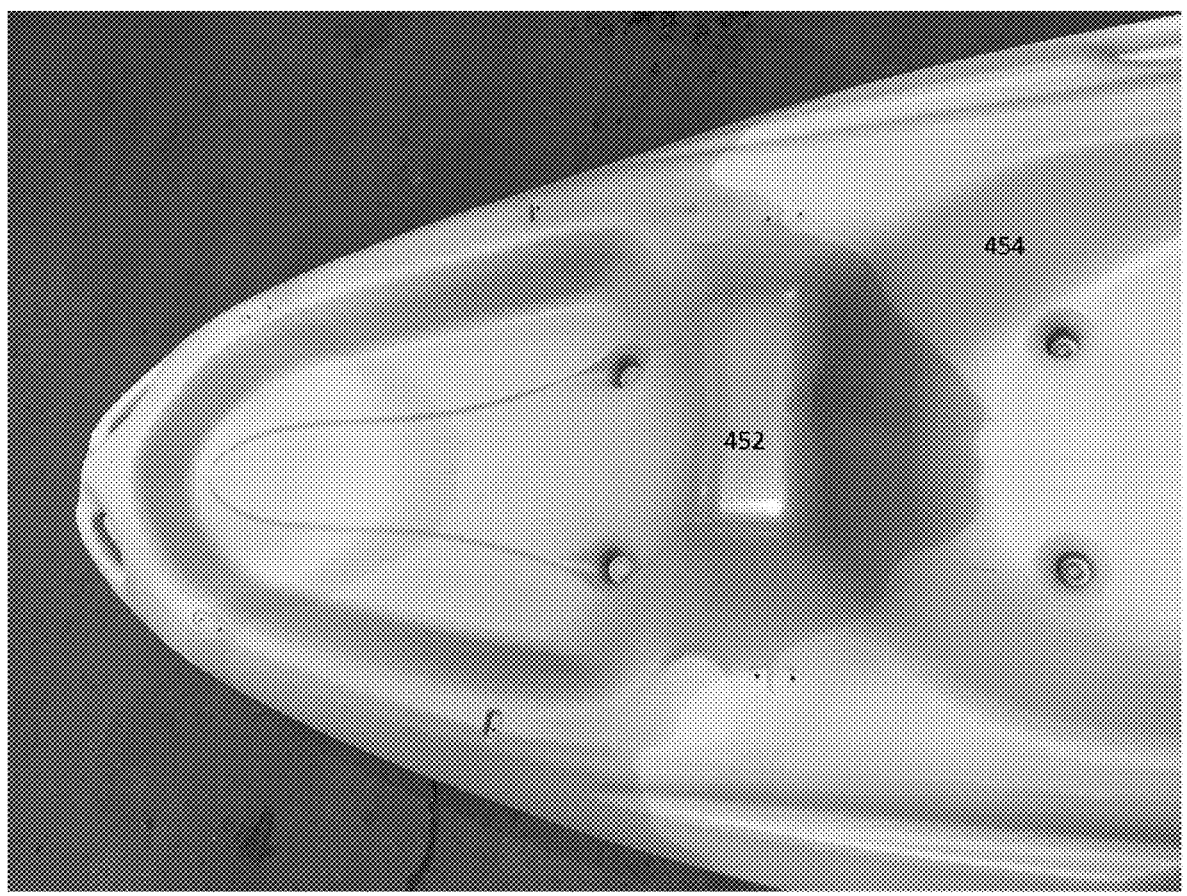
Figure 21:
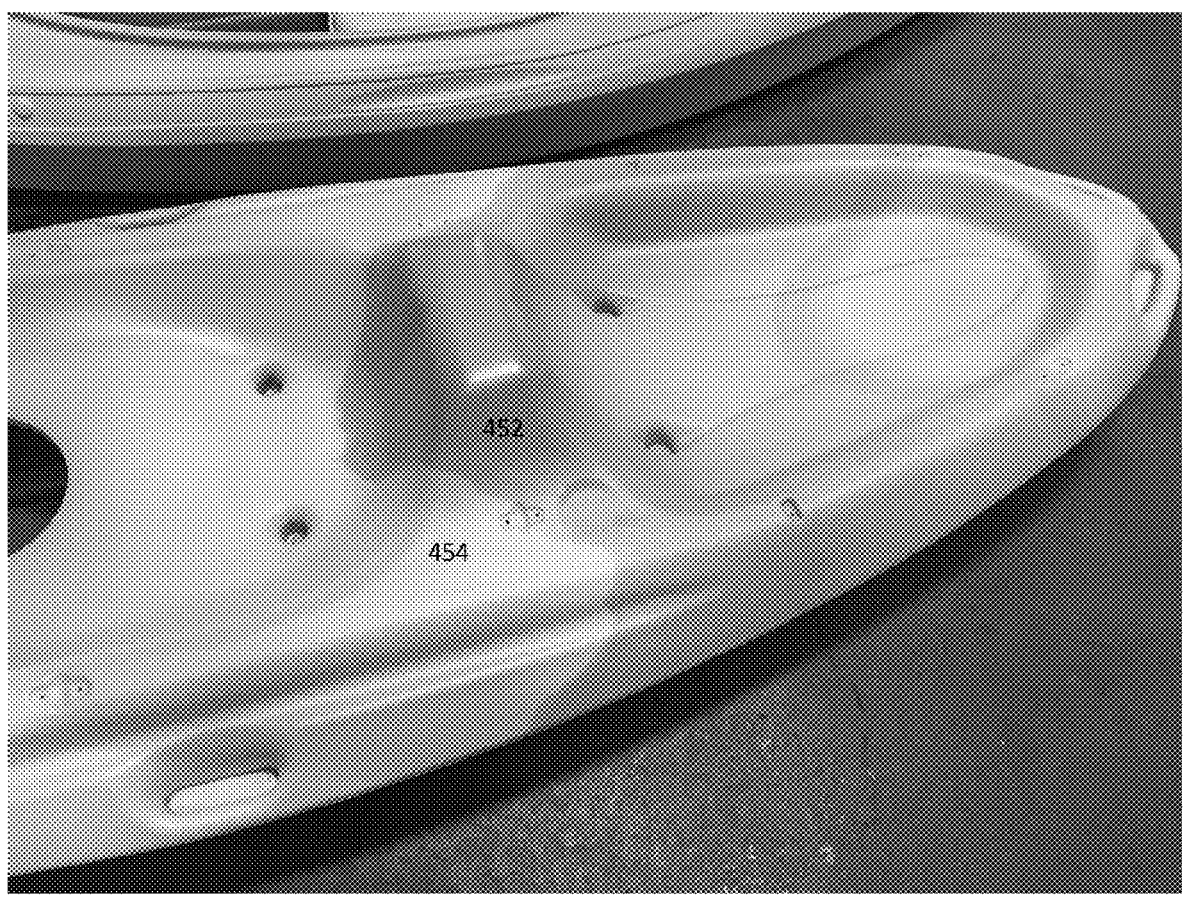

With continued attention to FIGS. 19 and 22, it can be seen that multiple color changes are present in at least the after portion of the kayak 450, on both the top and bottom of the kayak 450. While the color changes collectively constitute a gradient, it can be seen that, with reference first to FIG. 19, there are distinct bands 1a, 2a, 3a and 4a, of colors in which the color steps from one tone to another. A similar effect is illustrated by the bands 1b, 2b, 3b and 4b in FIG. 22. Thus, banding and color gradients are examples of yet further effects that can be achieved in various embodiments of the invention.

The bands, and other effects disclosed herein, may reflect slight pulsations imposed by one or more of the accumulator heads as the plastic exits the accumulator heads to form the parison. Additionally, or alternatively, the bands may result to some extent from creep of the plastic in the parison once the parison has been formed. Another mechanism that can be involved is temperature differentials in the parison. In particular, the portion of the parison nearest the accumulator heads is likely to be relatively warmer than, for example, the bottom of the parison.

It can also be seen in various Figures herein, such as FIGS. 15-17, 19, 20, 21 and 22, that in at least some embodiments, the blow molded structure may be relatively darker at one end than the other. Typically, though not necessarily, the relatively darker end is formed from the lower end of the corresponding parison. This effect is believed to result from one or more of a variety of causes, one example of which is relatively greater stretching of the upper end of the parison as a result of the weight of the lower portion of the parison. As there is relatively less weight acting on the lower end of the parison, the lower end may not stretch as much as the upper end, so that the relatively darker color is preserved to a greater extent than it is at the upper end of the parison. The relatively darker end of the parison may additionally, or alternatively, be due to the initial position of the darker plastic in the accumulator head of the EBM machine. Particularly, the darker plastic may initially be unblended, or only slightly blended with another color of plastic. The nature of the extrusion process is such that the bottom of the parison is extruded first, while the top of the parison is extruded last. Thus, at the beginning of the extrusion process, the darker color may be predominant at the bottom of the parison.

F. Use of Regrind

Figure 23:
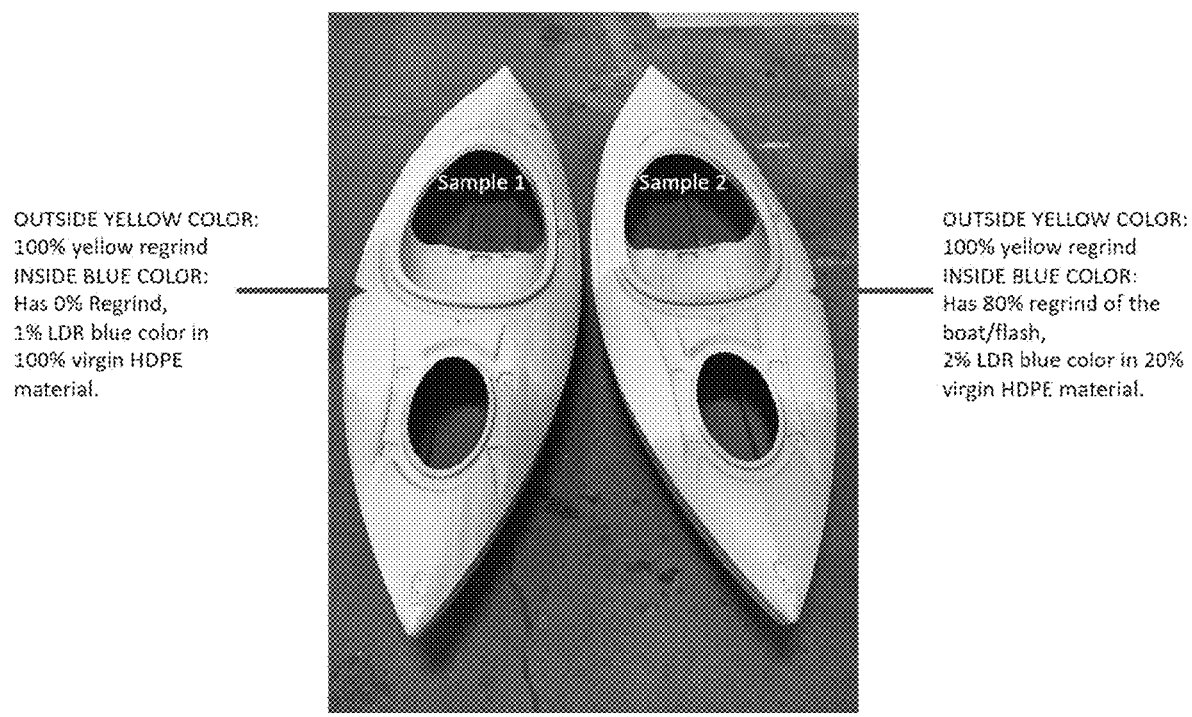
FIGS. 23-25 disclose various example color effects achieved with the use of varying amounts of regrind.
Figure 24:
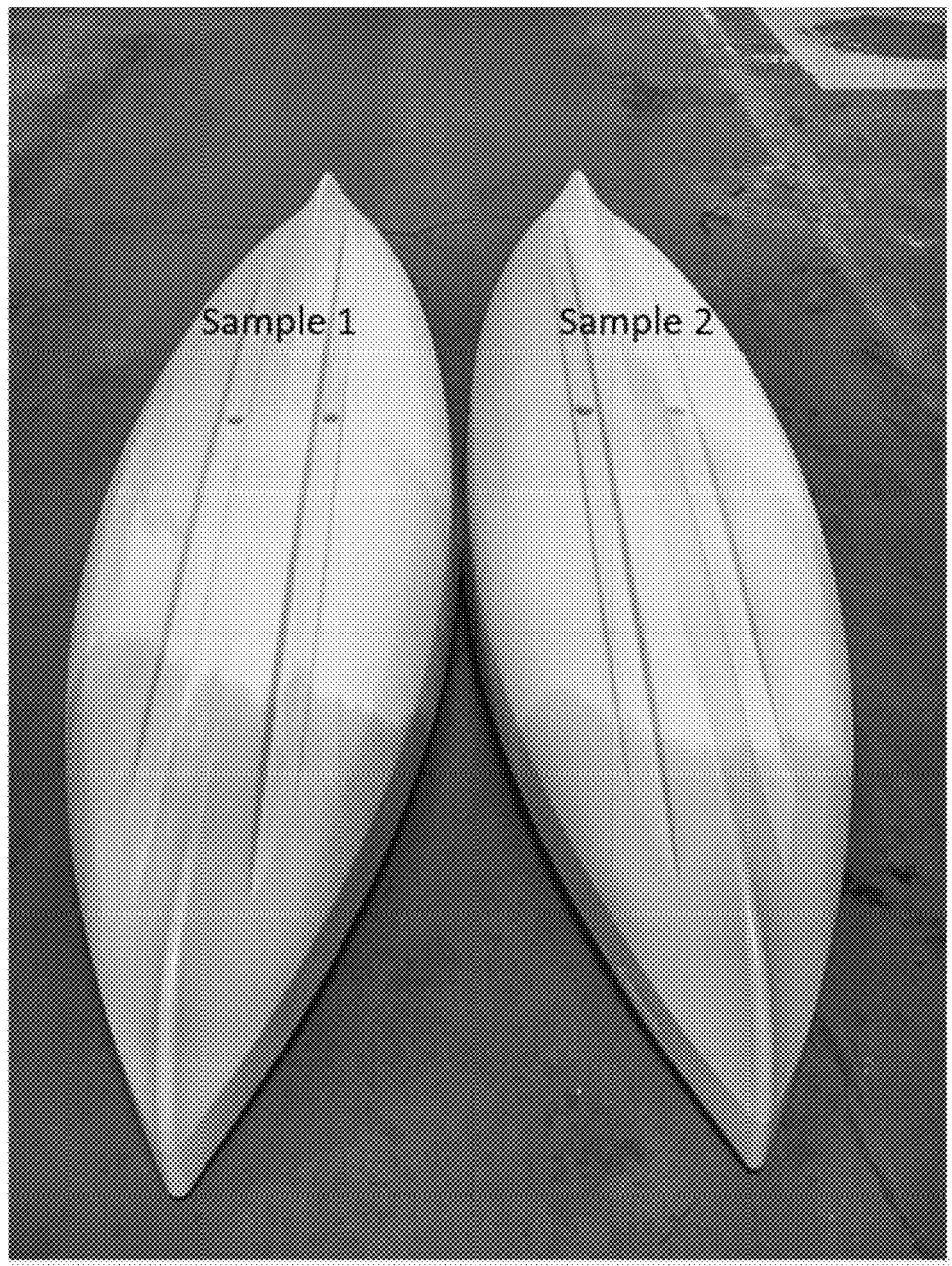
Figure 25:
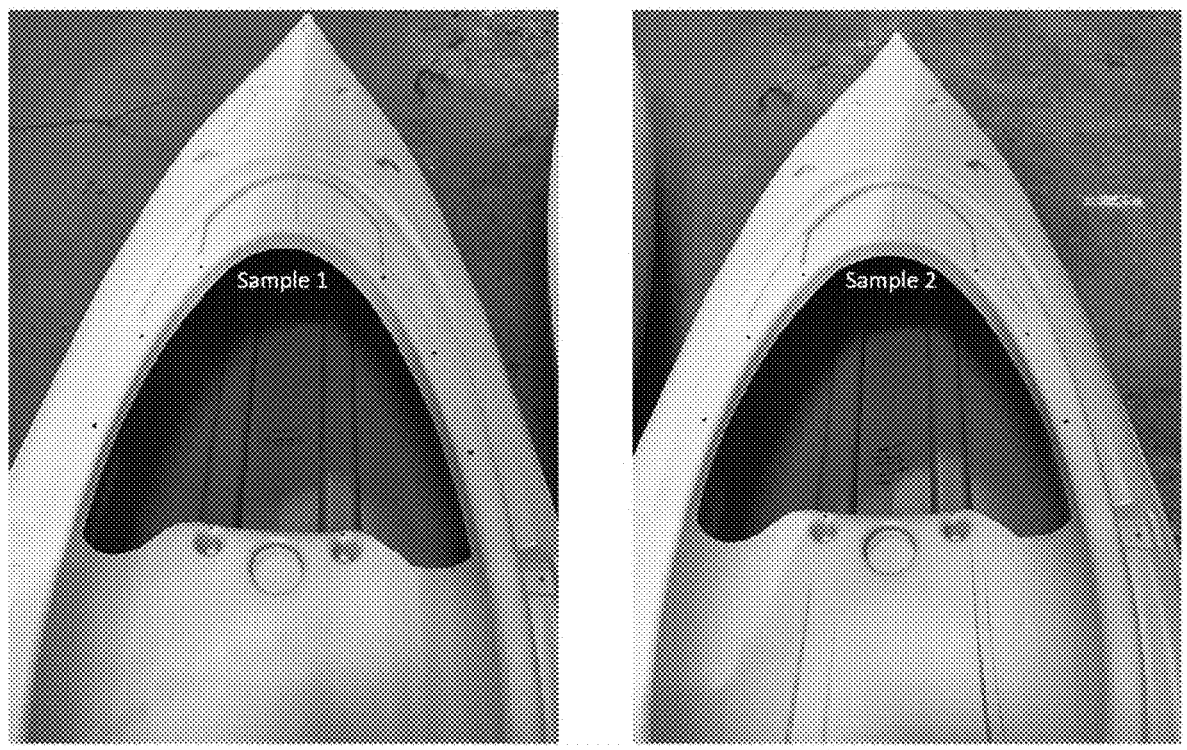

With attention now to FIGS. 23-25, details are provided concerning some example structures produced using various amounts of regrind. In conventional products and processes, the use of multicolored regrind would be considered undesirable since it would not produce a uniformly colored product. Consider a hypothetical situation where a green product is desired to be produced. In this case, blue plastic and yellow plastic would have to be mixed with each other in the appropriate proportions prior to extrusion to ensure that the parison, and final product, was green throughout and did not include any discernible yellow or blue portions. As well, if a conventional molding process were to use multiple colors, that process may conceivably produce unpredictable and, thus, undesirable, results in terms of product attributes such as color, tone, color depth, and color distribution.

In particular, without homogenous blending of the blue and yellow plastics prior to extrusion, the final product in this hypothetical would include likely irregularities in one or more of color, color gradient, tone, color depth, and color distribution. These would be unacceptable results where a single color product is desired. Moreover, such irregularities would be apparent in the regrind as well and, as such, the regrind likely could not be used in the creation of additional products in the desired green color. However, typical blow molding processes, particularly for large products, are predicated on the use of regrind in order to attain economic efficiency of the process. Thus, there has been little incentive to use multicolor regrind in conventional processes and products. To the extent that multicolor regrind has been used, its use is typically limited to portions of the product that would not be visible to the end user.

In contrast with such conventional approaches however, embodiments of the invention make effective use of multicolored regrind. As well, such embodiments may produce results that, while unpredictable and/or unrepeatable, may nonetheless be desirable. For example, in Sample 1 of FIGS. 23-25, the outside layer of the kayak is 100 percent yellow regrind, although as discussed below in connection with FIG. 31, other embodiments are configured with an outside layer that includes no regrind. The inner layer of the kayak in Sample 1 has zero percent regrind, and 1 percent LDR blue color mixed into 100 percent virgin HDPE. That is, the inner layer includes the LDR blue color and HDPE, where all of the HDPE in the inner layer is virgin (uncolored) HDPE and does not include any regrind. Using these proportions, a mixture can be created that includes 100 pounds of virgin HDPE and 1 pound of LDR blue color, resulting in a mixture that weighs a total of 101 pounds.

Similar to Sample 1, Sample 2 of FIGS. 23-25 illustrates an outside layer of the kayak that is 100 percent yellow regrind. The similarity in the outer layers is clearly illustrated in FIGS. 23 and 24, which also show the randomness and repeatability of color distribution in two instances of the same product. Although FIGS. 23 and 24 indicate that color distributions are repeatable to some extent in multiple instances of the same blow molded structure, it should also be apparent from those Figures that the color distributions nonetheless possess any number and type of variations relative to each other. Such variations may not be repeatable in other instances of the product, and/or may be obtained on an unpredictable basis.

In contrast with Sample 1 however, the inner layer of the kayak in Sample 2 has 80 percent regrind, and 2 percent letdown rate (LDR) blue color mixed into 20 percent virgin HDPE. Thus, the inner layer in sample 2 is dark green, rather than blue as in Sample 1. As can be seen from Sample 2, the inner layer has a uniform color throughout, and is aesthetically pleasing. Thus, Sample 2 illustrates that a significant portion of regrind can be used to obtain good aesthetic and economic results.

It should be noted that various types of additives can be employed in some embodiments. For example, a mixture of plastic, such as HDPE, and one or more colors may additionally include calcium (Ca) and/or one or more calcium compounds. The use of calcium and/or calcium compounds in one or more embodiments may produce desirable color and/or finish effects in the final blow molded product.

As in the case of any disclosed embodiment, parameters such as percent regrind, regrind color(s), percent virgin resin (one example of which is HDPE), and percent color(s), can be varied in one or more layers of a blow molded structure. More particularly, any group of one or more of the aforementioned parameters can be varied in one or more layers of a blow molded structure. As such, the scope of the invention is not limited to the illustrative examples disclosed herein.

G. Multilayer Configurations

Figure 26:
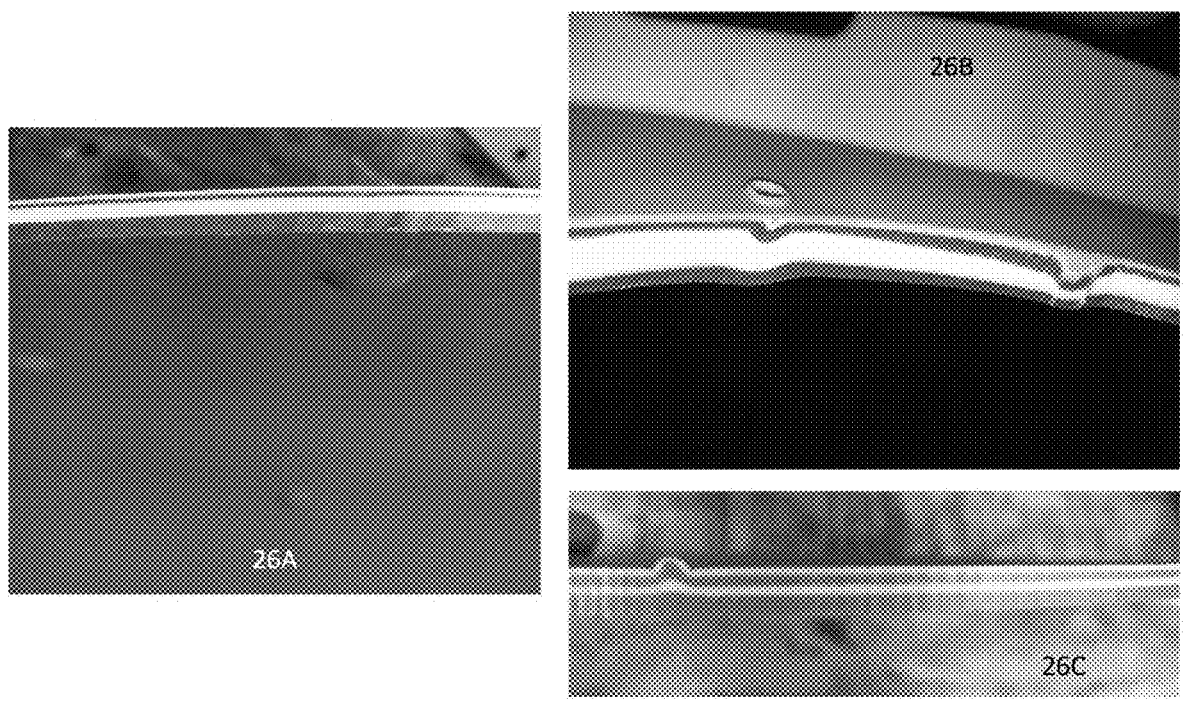
FIG. 26 discloses example embodiments of a portion of a blow molded structure that includes more than two layers.

Turning now to FIG. 26, details are provided concerning some example multilayer configurations in products made with an EBM process. As shown in FIG. 26, embodiments of the invention extend to structures with multiple layers. The structures can be configured so that one or more portions of the structure, or the entire structure, includes any number of layers greater than two layers.

With reference first to the view designated 26a, the indicated portion of the structure includes a total of four layers that alternate in color between primary colors such as red and yellow, although one or more non-primary colors could be used. The layers also vary in their respective thicknesses, with the two lowermost layers being approximately the same thickness, and thicker than the two uppermost layers, which have about the same thickness as each other. It can also be seen in view 26a that no bleed through or blending has occurred between the red and yellow layers. In other embodiments (not shown in FIG. 26), blending and bleeding can occur between adjacent red and yellow layers. The configuration shown in view 26a can be produced using an EBM process and two colors of plastic, that is, red and yellow.

With reference now to the view designated 26b, the indicated portion of the structure includes a total of five layers, namely, a relatively thick white layer positioned between relatively thinner first and second blue layers, a relatively thin white layer on top of the upper blue layer, and a blended blue and white layer on top of the relatively thin white layer. In contrast with the configuration in view 26a, some blending and bleeding of the uppermost blue and white layers has occurred to produce the top blended layer of blue and white, while the color integrity of the lower layers has been maintained. The configuration shown in view 26b can be produced using an EBM process and two colors of plastic, that is, blue and white.

With reference finally to the view designated 26c, the indicated portion of the structure includes a total of four layers, namely, two relatively thin light green layers interleaved with two relatively thicker light blue layers. The light green and light blue layers can include some regrind, which will contribute to the illustrated colors. The configuration shown in view 26c can be produced using an EBM process and two colors of plastic that each include some regrind.

H. Example Production Equipment

As noted earlier, some, or all, disclosed embodiments of blow molded structures can be created using an EBM process that can be carried out by an extrusion machine having multiple accumulator heads, where each accumulator head can extrude a particular respective color. In at least some embodiments, the extrusion machine includes a material accumulator head. Extrusion machines produced by Krupp Kautex can be employed in some embodiments. For example, Krupp Kautex model AKK-60L-02-600-Fifo, and Krupp Kautex model AKK-80L-01-600-Fifo, are example extrusion machines that maybe employed in connection with the production of various disclosed embodiments. Any other extrusion machine(s) of comparable functionality could alternatively be employed however. In any case, attention is directed now to FIGS. 27 and 28 which disclose aspects of one such extrusion machine. In some embodiments, such as the examples discussed below, the extrusion machine employs a double heart diverter. However, other embodiments may employ diverter configurations other than a double heart configuration.

Figure 27:
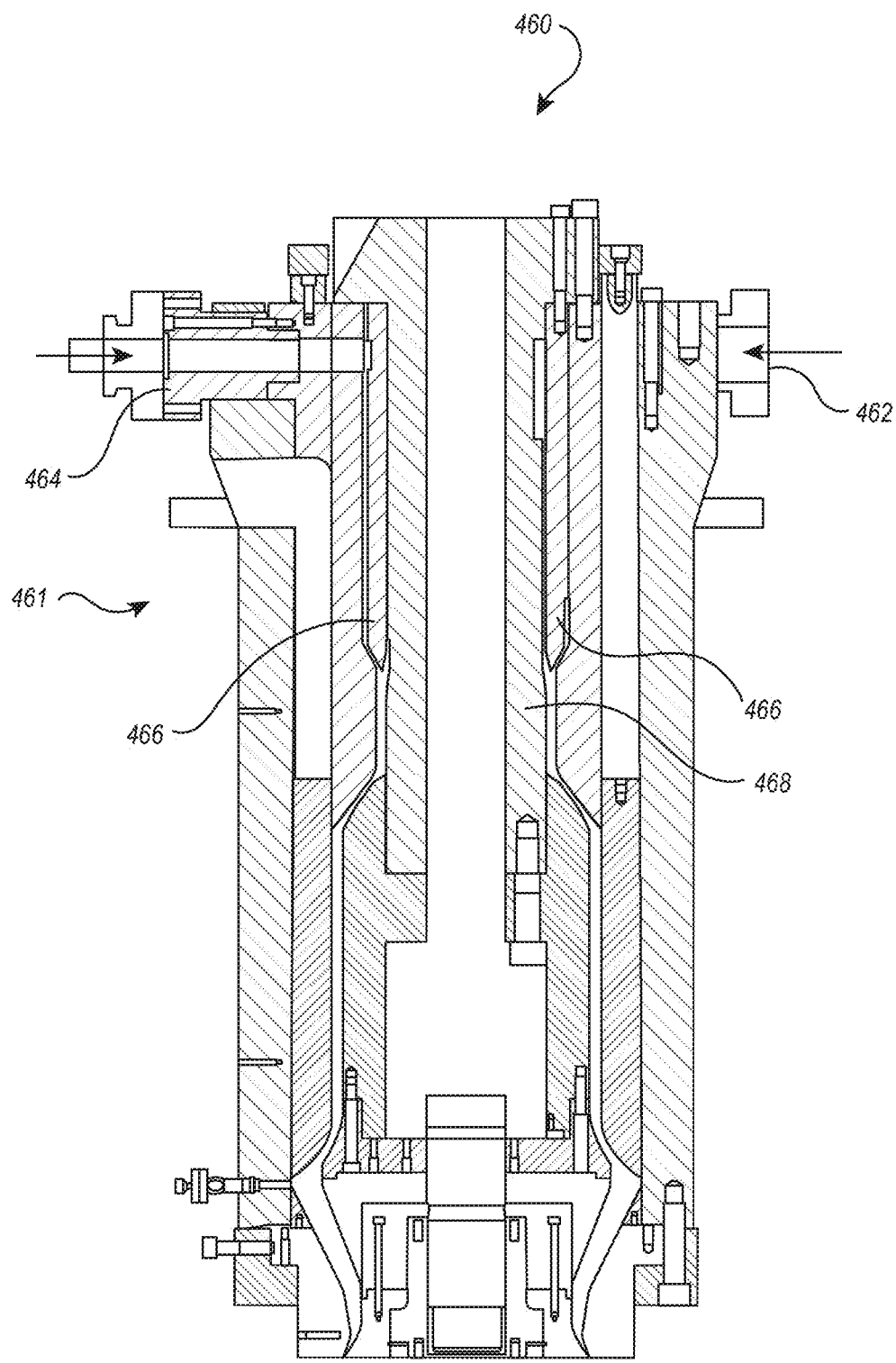
FIGS. 27-28 disclose aspects of an example extrusion machine with dual extruders and an accumulator head.
Figure 28:
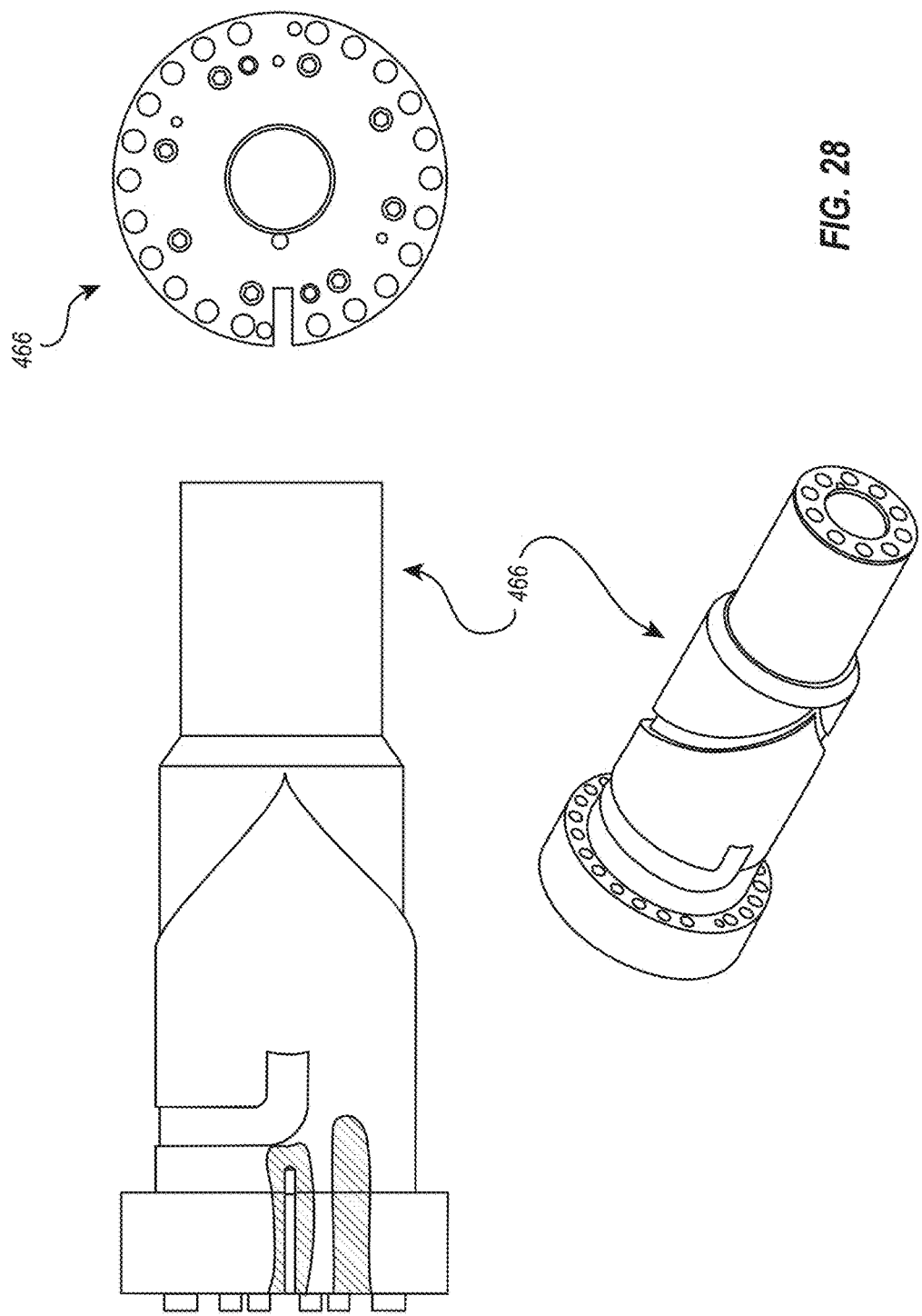

The particular machine disclosed in FIGS. 27 and 28 is a Krupp Kautex (KK) extrusion machine 460 with a double heart diverter configuration and a material accumulator head 461. As shown, the KK machine includes Extruder #1 462 and Extruder #2 464, each of which extrudes a respective layer of plastic. Extruder #1 462 extrudes the inner layer, and Extruder #2 464 extrudes the outer layer. A double heart diverter 466 maintains separation between the two different colors of plastic until the flows of plastic reach the core tube 468. Among other things, the double heart diverter 466 may create an unevenness in the layers it creates, that is, the thickness of the plastic flow as it enters the double heart diverter 466 may be relatively greater than the thickness of that plastic flow when the plastic flows around the side of the double heart diverter 466 opposite the entry point of the plastic flow.

In more detail, the plastic from Extruder #1 flows inside of the double heart diverter between the double heart diverter and the core tube. The plastic from Extruder #2, which forms the outer layer, flows outside of the double heart diverter. The two flows then come into contact with each other when they reach the core tube, such that plastic from Extruder #1 forms the inner layer of a parison, and plastic from Extruder #2 forms the outside layer of the parison, so that a dual layer parison is created.

Figure 28A:
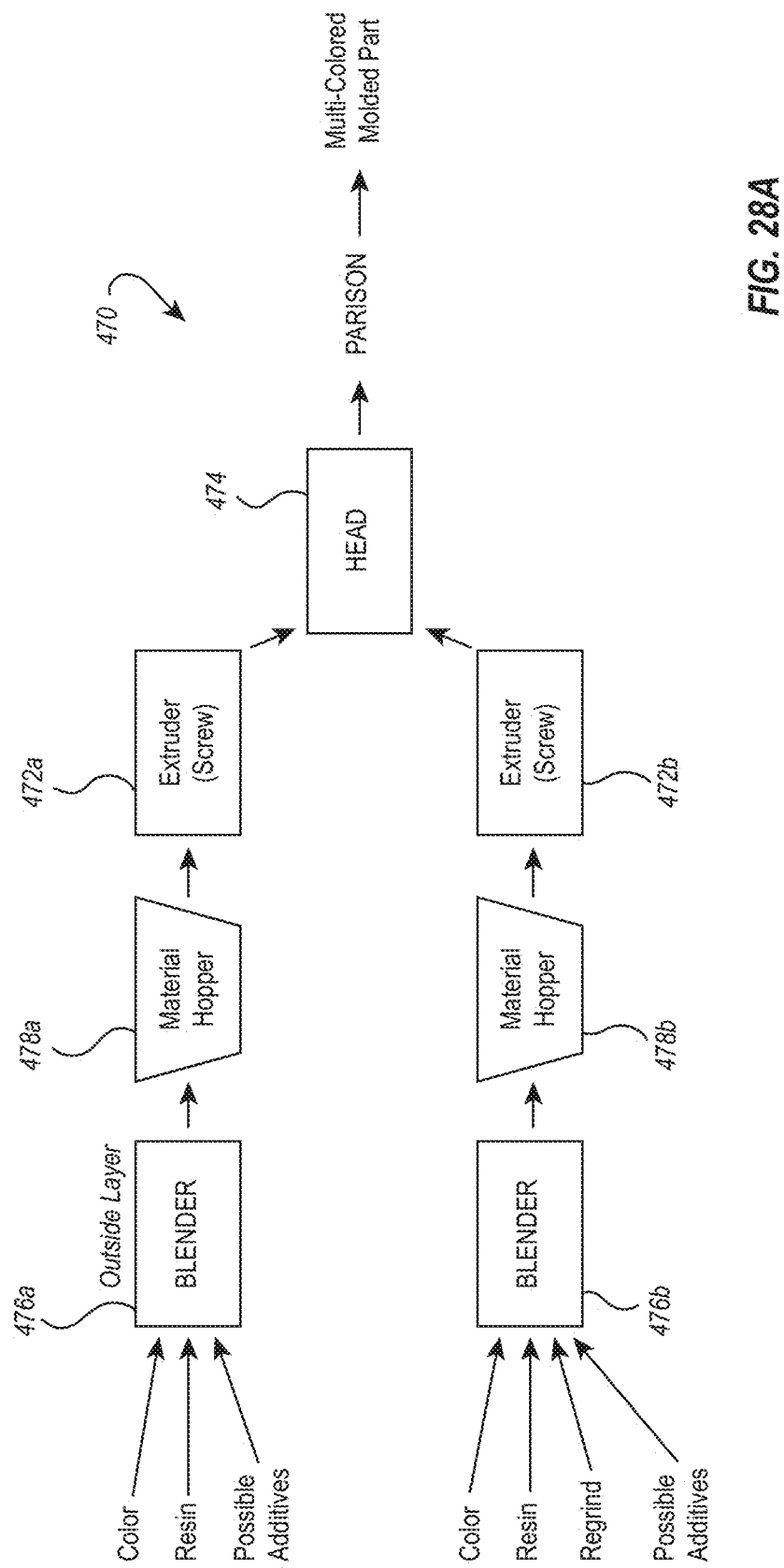
FIG. 28a is a diagram of an example system and components that may be used to produce the color effects disclosed herein.

Turning now to FIG. 28a, details are provided concerning an example system 470 that may be employed to produce blow molded structures having characteristics disclosed herein. In this example, the system includes an EBM machine 470, examples of which are disclosed herein, that comprises first and second extruders 472a and 472b, and an accumulator head 474 that receives respective first and second flows of melted plastic from the first and second extruders 472a and 472b, which may be screw type extruders. The system 470 further includes a first material feed path that is defined in part by a first blender 476a and a first material hopper 478a. A second material feed path is defined in part by a second blender 476b and a second material hopper 478b. Each of the first and second material feed paths supplies plastic that will be used by the accumulator head 474 to define a respective layer of the parison.

In operations involving the first material feed path, a combination of color(s) and resin are mixed together in the blender 476a. The mixture may also include additives, examples of which are disclosed herein. After blending, the material mixture is transferred to the material hopper 478a to await feeding to the extruder 472a. During all of the aforementioned processes, the plastic in the material mixture is in an unmelted form, such as plastic pellets for example. The plastic pellets are melted in the extruder 472a and the melted mixture then supplied by the extruder 472a to the accumulator head 474, which then forms the parison, whose outer layer is formed by the melted plastic supplied by the extruder 472a.

A similar process, can be employed with respect to the material feed path that includes the blender 476b, material hopper 478b, and extruder 472b. In this process, color, resin, and possibly additives are mixed together. Additionally, regrind may be added to the mixture as well. The plastic pellets are melted in the extruder 472b and the melted mixture then supplied by the extruder 472b to the accumulator head 474, which then forms the parison, whose inner layer is formed by the melted plastic supplied by the extruder 472b.

Advantageously, the use of multiple blenders, as in the example embodiment of FIG. 28a, enables the use of two independent material feed paths. Thus, various materials can be added to either of the material flows by way of the appropriate blender. To illustrate, and with reference to FIG. 28a, regrind may be added to the blender 476b, but not to the blender 476a.

I. Aspects of Some Example Methods

Figure 29:
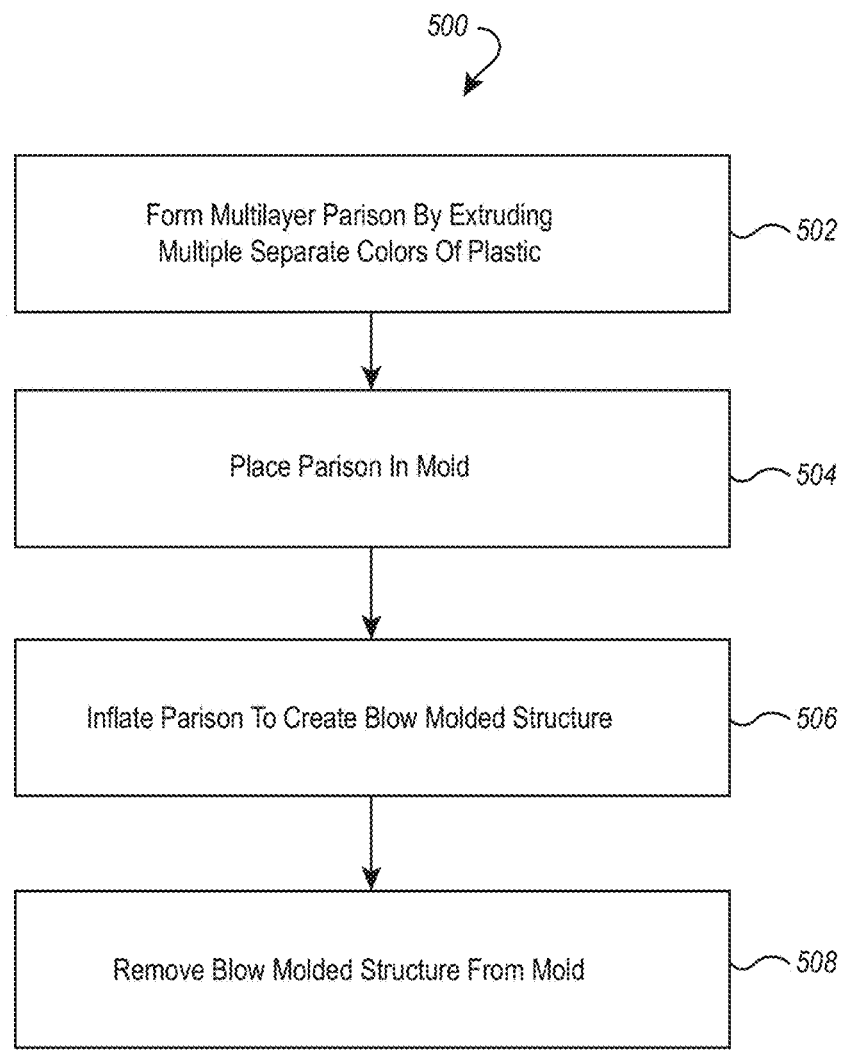
FIG. 29 discloses aspects of an example method for achieving various color effects through adjustment of operational parameters of an extrusion machine.

With reference now to FIG. 29, details are provided concerning EBM processes that involves the extrusion of multiple flows of plastic of different respective colors. One example of such a process takes the form of an extrusion blow molding process and is denoted generally at 500. The process 500 can be performed with an extrusion machine that includes two or more feed screws.

The process 500 can begin when a multilayer parison is formed 502 by extruding multiple separate flows of plastic, where each flow of plastic has a different color. The extrusion of the flows can begin and/or end at the same time, although that is not required. Even if the extrusion of the flows does not begin and/or end at the same time, the respective extrusion processes for the flows of plastic may partly overlap in time with each other.

After the parison is formed 502, it is then placed in a mold 504. The mold is then closed and the parison inflated 506 using a device such as a blow pin. The inflation of the parison causes the parison to come into contact with the mold and the layers of the parison conform to the interior shape of the mold. The mold is allowed to cool so that the molded plastic will retain its shape, and then the blow molded structure is removed 508 from the mold. Finishing of the blow molded structure produces regrind that may be used in the production of another blow molded structure.

Figure 30:
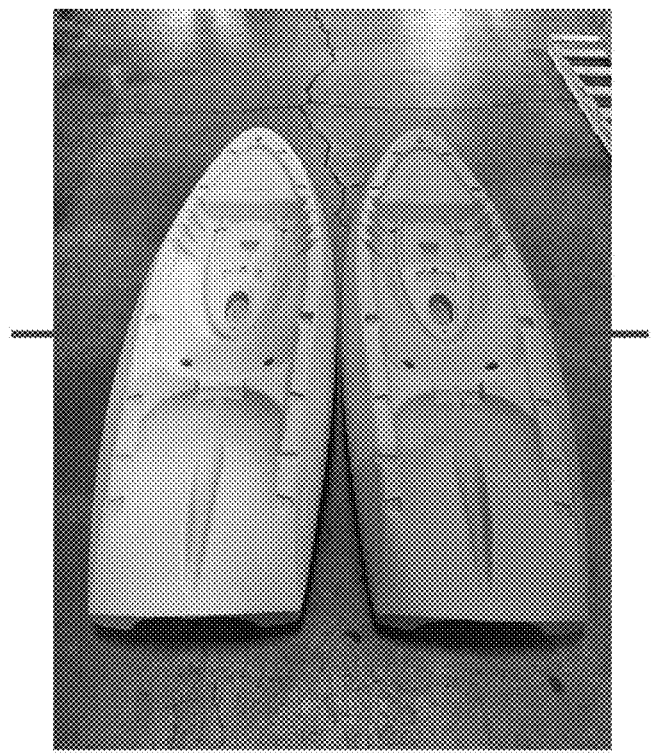
FIG. 30 discloses example color effects achieved through adjustment of operational parameters of an extrusion machine.

With continued reference to FIG. 29, and directing attention now to FIG. 30, details are provided concerning some example blow molded structures produced by an extrusion blow molding process performed with an extrusion machine that includes two extruders and two feed screws. Two colors of plastic were used, specifically, red and yellow. In the case of the kayak on the left, both feed screws were operated at the same speed. While not specifically shown, the interior of the sit-on-top kayak on the left is red, and the exterior tinged somewhat with red but predominantly yellow in color.

In the case of the kayak on the right, the feed screw speed for the red plastic (inner layer) was increased, and the feed screw speed for the yellow plastic (outside layer) was correspondingly decreased. Thus, the total amount of plastic being extruded was unchanged from the amount extruded in the production of the kayak on the left, and only the proportion of red to yellow was changed when producing the kayak on the right. As a result of the relatively higher feed screw speed for the red plastic flow, the red color predominates in the finished product, which is red/orange in appearance. In this example, the feed screw speeds were maintained for the majority of the shot.

Turning next to FIG. 31, various configurations are disclosed in which different amounts of regrind are used in the inner layer, while no regrind is employed in the outer layer. In all three examples, the inner layer included 1% blue, although the amount of regrind employed in the inner layers varied. Thus, the uppermost sample did not include any regrind in the inner layer, while the middle and lowermost samples included 80% regrind material. The outer layers of all three samples did not include any regrind, and each included 1% yellow. As also indicated in FIG. 31, variations to the opacity of the blue color affected the look of the outer layer. For example, the blue employed in the lowermost sample was relatively more opaque than the blue used in the outer layer of the center sample and uppermost sample. This differential in opacity manifests itself in terms of the relative influence of the blue color, where the more opaque blue provides a relatively darker color (lowermost sample) and the less opaque blue (center and uppermost samples). It should be noted that while the outer layer of the uppermost sample is dark, similar to the outer layer of the lowermost sample with the more opaque blue, the darkness of the uppermost sample relative to the center sample is due to the fact that the center sample used 80% regrind in the inner layer, while the uppermost sample used no regrind in the inner layer.

J. Additional Example Embodiments

Following is a listing of additional example embodiments of the invention.

Embodiment 1

An extrusion blow molding (EBM) method, comprising: extruding first and second colors of plastic to form a parison, wherein the parison includes an inner layer of the first color of plastic, and an outer layer of the second color of plastic; placing the parison in a mold; closing the mold; inflating the parison to create a blow molded structure; and removing the blow molded structure from the mold, wherein a portion of an interior of the blow molded structure comprises the first color of plastic, and a portion of an exterior of the blow molded structure comprises a blend of the first color of plastic and the second color of plastic.

Embodiment 2

The method as recited in embodiment 1, wherein during and/or after extrusion, the first color of plastic of the inner layer blends with and/or bleeds into the second color of plastic of the outer layer.

Embodiment 3

The method as recited in embodiment 1, wherein the parison includes more than two layers.

Embodiment 4

The method as recited in embodiment 1, wherein the layers vary in thickness, but the overall thickness of a cross-section of the blow-molded structure is substantially constant.

Embodiment 5

The method as recited in embodiment 1, wherein one of the extruded plastics includes regrind.

Embodiment 6

The method as recited in embodiment 5, wherein the regrind comprises a combination of the first and second colors.

Embodiment 7

The method as recited in embodiment 1, wherein the first color and the second color are not blended with each other prior to extrusion.

Embodiment 8

The method as recited in embodiment 1, wherein the exterior of the blow molded structure includes one or more randomly distributed irregularities in one or more of color, color gradient, tone, color depth, and color distribution.

Embodiment 9

The method as recited in embodiment 1, wherein the blow molded structure has a layered configuration in which an inner layer is the first color of plastic and an adjacent outer layer comprises a blend of the first color of plastic and the second color of plastic.

Embodiment 10

The method as recited in embodiment 1, wherein a feed rate of the first color of plastic is different from a feed rate of the second color of plastic.

Embodiment 11

The method as recited in embodiment 1, wherein the blow molded structure is a watercraft.

Embodiment 12

The method as recited in embodiment 1, wherein the extrusion process is performed by an extrusion machine that includes an accumulator head and a double heart diverter.

Embodiment 13

The method as recited in embodiment 1, wherein the blow molded structure is a structure other than a watercraft.

Embodiment 14

The method as recited in embodiment 1, wherein the two layer configuration of the parison extends over the entire length of the parison.

Embodiment 15

The method as recited in embodiment 1, wherein a feed rate of the first color of plastic to an extrusion die is the same as a feed rate of the second color of plastic to the extrusion die.

Embodiment 16

The method as recited in embodiment 1, wherein the plastic of the first color and the plastic of the second color are the same physically and chemically identical polymer.

Embodiment 17

The method as recited in embodiment 1, wherein the blow molded structure is created without the use of a preform.

Embodiment 18

A blow molded structure, comprising:
a first layer of plastic consisting of a single color; and a second layer of plastic comprising, or consisting of, a blend of the first color of plastic and one or more other colors, and the first color of plastic in the second layer is bleed through from the first layer.

Embodiment 19

The blow molded structure as recited in embodiment 18, wherein the second layer of plastic includes one or more irregularities in one or more of color, color gradient, tone, color depth, and color distribution.

Embodiment 20

The blow molded structure as recited in embodiment 18, wherein one or both of the layers varies in thickness at different locations in the blow molded structure.

Embodiment 21

The blow molded structure as recited in embodiment 18, wherein the second layer is adjacent to the first layer.

Embodiment 22

The blow molded structure as recited in embodiment 18, further comprising one or more layers of plastic.

Embodiment 23

The blow molded structure as recited in embodiment 18, wherein the second layer is stretched relative to the first layer in one or more locations of the blow molded structure.

Embodiment 24

The method as recited in embodiment 1, wherein one of the first and second colors has an opacity that is different from an opacity of the other of the first and second colors.

Embodiment 25

The blow molded structure according to any of embodiments 18-24, wherein the blow molded structure is a watercraft.

K. Advantages and Other Considerations

As is apparent from this disclosure, embodiments of the invention may provide a variety of advantages and unexpected results. For example, it was believed that extrusion of two different colors of plastic would result in a blow molded structure, such as a kayak for example, whose interior was one color, and whose exterior was the other color. That is, no blending or bleeding between layers of the two different colors was expected. In fact however, the interior (layer) can be one color, and the exterior (layer) can be a blend of the interior color and one or more other colors.

As well, embodiments of the invention are well suited to use a significant amount of regrind, while preserving, or enhancing, aesthetic aspects of the blow molded product where the regrind is employed. This use of regrind can provide a substantial economic benefit as it greatly reduces the amount of waste plastic generated.

Although this disclosure has been described in terms of certain embodiments, other embodiments apparent to those of ordinary skill in the art are also within the scope of this disclosure. Accordingly, the scope of the disclosure is intended to be defined only by the claims which follow.

What is claimed is:

1. A method, comprising:
   extruding plastic of a first color and plastic of a second color to form a parison comprising melted plastic, wherein the parison includes an inner layer comprising the plastic of the first color, and the parison also includes an outer layer comprising the plastic of the second color, and wherein during and/or after the extruding, the plastic of the first color blends together with the plastic of the second color so that a portion of the parison comprises a blend of the plastic of the first color and the plastic of the second color;
   placing the parison in a mold; and
   inflating the parison to create a blow molded structure.

2. The method as recited in claim 1, wherein a portion of the outer layer of the parison comprises the blend.

3. The method as recited in claim 1, wherein a portion of an exterior of the blow molded structure comprises the blend.

4. The method as recited in claim 1, wherein the inner layer and the outer layer each vary in thickness, but the overall thickness of a cross-section of the blow-molded structure is substantially constant.

5. The method as recited in claim 1, wherein one of the plastic of the first color and the plastic of the second color includes regrind.

6. The method as recited in claim 5, wherein the regrind comprises a combination of the plastic of the first color and the plastic of the second color.

7. The method as recited in claim 1, wherein the plastic of the first color and the plastic of the second color are not blended with each other until after exiting a diverter.

8. The method as recited in claim 1, wherein a portion of an exterior of the blow molded structure includes one or more randomly distributed irregularities in one or more of color, color gradient, tone, color depth, and color distribution.

9. The method as recited in claim 1, wherein a portion of an interior of the blow molded structure is defined by the inner layer of the parison, and a portion of an exterior of the blow molded structure is defined by the outer layer of the parison.

10. The method as recited in claim 1, wherein a feed rate of the plastic of the first color is different from a feed rate of the plastic of the second color.

11. The method as recited in claim 1, wherein the blow molded structure is a watercraft.

12. The method as recited in claim 1, wherein the extrusion process is performed by an extrusion machine that includes an accumulator head and a double heart diverter.

13. The method as recited in claim 1, wherein the blow molded structure is other than a watercraft.

14. The method as recited in claim 1, wherein the inner layer of the parison and the outer layer of the parison extend over an entire length of the parison.

15. The method as recited in claim 1, wherein a feed rate of the plastic of the first color to an extrusion die is the same as a feed rate of the plastic of the second color to the extrusion die.

16. The method as recited in claim 1, wherein the plastic of the first color and the plastic of the second color are the same physically and chemically identical polymer.

17. The method as recited in claim 1, wherein the blow molded structure is created without the use of a preform or an overmold.

18. The method as recited in claim 1, wherein the inner layer and the outer layer are attached to each other.

19. The method as recited in claim 1, wherein a portion of the blend is created during extrusion.

20. The method as recited in claim 1, wherein the blow molded structure is created without the use of injection molding, stretch blow molding, rotomolding, or twin sheet molding.

21. A method, comprising:
   extruding a plastic of a first color and a plastic of a second color to form a parison comprising melted plastic, wherein during and/or after the extruding, plastic of the first color blends together with plastic of the second color so that a portion of the parison comprises a blend of the plastic of the first color and the plastic of the second color;
   placing the parison in a mold; and
   inflating the parison to create a blow molded structure.

22. The method as recited in claim 21, wherein a portion of an interior of the blow molded structure comprises the plastic of the first color.

23. The method as recited in claim 21, wherein the portion of the parison that comprises the blend forms a portion of an exterior of the blow molded structure, and the portion of the exterior has a third color that is different from the first color and the second color.

24. The method as recited in claim 21, wherein extrusion of the plastic of the first color overlaps in time with extrusion of the plastic of the second color.

25. The method as recited in claim 21, wherein the blend comprises high density polyethylene (HDPE) plastic.

26. The method as recited in claim 21, wherein the plastic of the second color comprises high density polyethylene (HDPE) plastic.

27. The method as recited in claim 21, wherein a portion of an exterior of the blow molded structure has a low surface gloss.

28. The method as recited in claim 21, wherein the plastic of the first color and the plastic of the second color both comprise high density polyethylene (HDPE) plastic.

29. The method as recited in claim 1, wherein the blend is formed by bleed through of one of the plastic of the first color and the plastic of the second color into the other of the plastic of the first color and the plastic of the second color.

* * * * *